US011755100B2

(12) United States Patent
Goel et al.

(10) Patent No.: US 11,755,100 B2
(45) Date of Patent: Sep. 12, 2023

(54) POWER/WORKLOAD MANAGEMENT SYSTEM

(71) Applicant: Dell Products L.P., Round Rock, TX (US)

(72) Inventors: Naman Goel, Bangalore (IN); Ravikanth Chaganti, Bangalore (IN); Ravishankar Kanakapura Nanjundaswamy, Bangalore (IN)

(73) Assignee: Dell Products L.P., Round Rock, TX (US)

( * ) Notice: Subject to any disclaimer, the term of this patent is extended or adjusted under 35 U.S.C. 154(b) by 0 days.

(21) Appl. No.: 17/205,825

(22) Filed: Mar. 18, 2021

(65) Prior Publication Data

US 2022/0300062 A1 Sep. 22, 2022

(51) Int. Cl.
| | |
|---|---|
| *G06F 1/26* | (2006.01) |
| *G06F 1/32* | (2019.01) |
| *G06F 1/3296* | (2019.01) |
| *G06F 1/329* | (2019.01) |
| *G06F 1/28* | (2006.01) |
| *G06F 1/30* | (2006.01) |
| *G06F 1/3228* | (2019.01) |

(52) U.S. Cl.
CPC ............ *G06F 1/3296* (2013.01); *G06F 1/263* (2013.01); *G06F 1/28* (2013.01); *G06F 1/305* (2013.01); *G06F 1/329* (2013.01); *G06F 1/3228* (2013.01)

(58) Field of Classification Search
CPC ............................... G06F 1/3296; G06F 1/263
See application file for complete search history.

(56) References Cited

U.S. PATENT DOCUMENTS

| | | | | |
|---|---|---|---|---|
| 10,587,199 | B1* | 3/2020 | Chan | H02M 1/08 |
| 10,666,723 | B2* | 5/2020 | Kitabayashi | H04L 67/32 |
| 2006/0053324 | A1* | 3/2006 | Giat | H04L 12/10 |
| | | | | 713/300 |
| 2013/0205126 | A1* | 8/2013 | Kruglick | G06F 9/4405 |
| | | | | 713/1 |
| 2014/0196050 | A1* | 7/2014 | Yu | G06F 9/5094 |
| | | | | 718/104 |
| 2015/0205644 | A1* | 7/2015 | Ito | G06F 9/4881 |
| | | | | 718/103 |
| 2015/0303688 | A1* | 10/2015 | Tsai | H02J 1/102 |
| | | | | 307/64 |

(Continued)

*Primary Examiner* — Mohammed H Rehman
(74) *Attorney, Agent, or Firm* — Joseph Mencher

(57) ABSTRACT

A power/workload management system includes a power system that is coupled to a first computing device that is configured to perform a first workload, as well as to a second computing device. A management subsystem is coupled to the first computing device and the second computing device, and operates to identify a reduced power event associated with the power system and, in response, determine that the first computing device is associated with a higher power consumption than the second computing device. In response to determining that the first computing device is associated with the higher power consumption than the second computing device, the management subsystem moves the first workload to the second computing device such that the second computing device performs the first workload, and configures the first computing device in a reduced power consumption state.

20 Claims, 23 Drawing Sheets

(56) References Cited

U.S. PATENT DOCUMENTS

| | | | |
|---|---|---|---|
| 2016/0088562 A1* | 3/2016 | Seo .................. | H04W 76/20 |
| | | | 455/574 |
| 2016/0252953 A1* | 9/2016 | Rallo ................. | G06F 1/3228 |
| | | | 713/323 |
| 2017/0168872 A1* | 6/2017 | Kim .................. | G06F 9/4887 |
| 2018/0136979 A1* | 5/2018 | Morris ............... | G06F 9/5055 |
| 2019/0052078 A1* | 2/2019 | Krenz ................ | H02J 3/38 |
| 2019/0079799 A1* | 3/2019 | Kumar ............... | G06F 9/4843 |
| 2019/0141208 A1* | 5/2019 | Nozawa ............. | H04N 1/00005 |
| 2020/0067438 A1* | 2/2020 | Taniguchi ........... | H02P 9/10 |
| 2021/0318745 A1* | 10/2021 | Manousakis ........ | G06F 9/45558 |

* cited by examiner

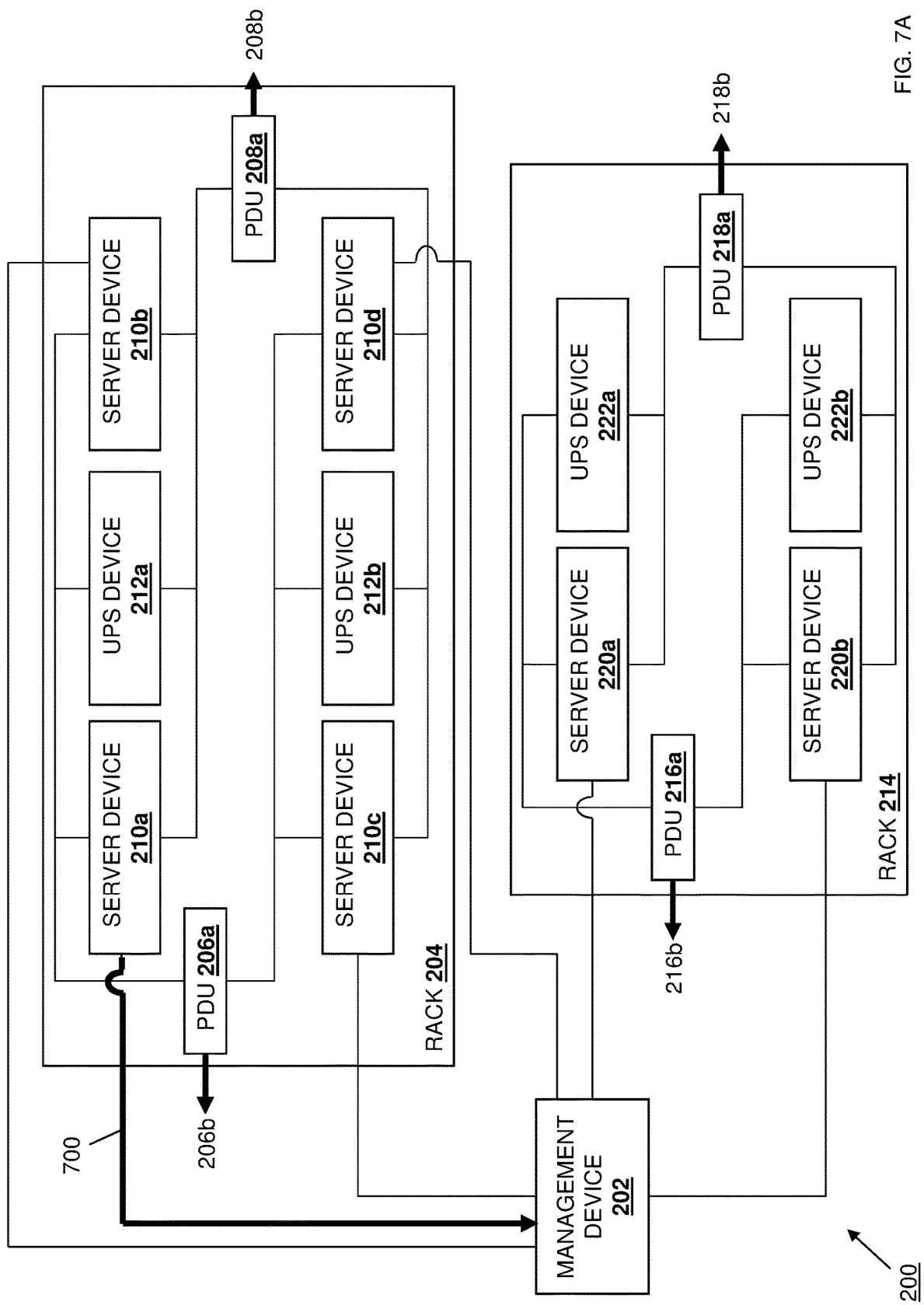

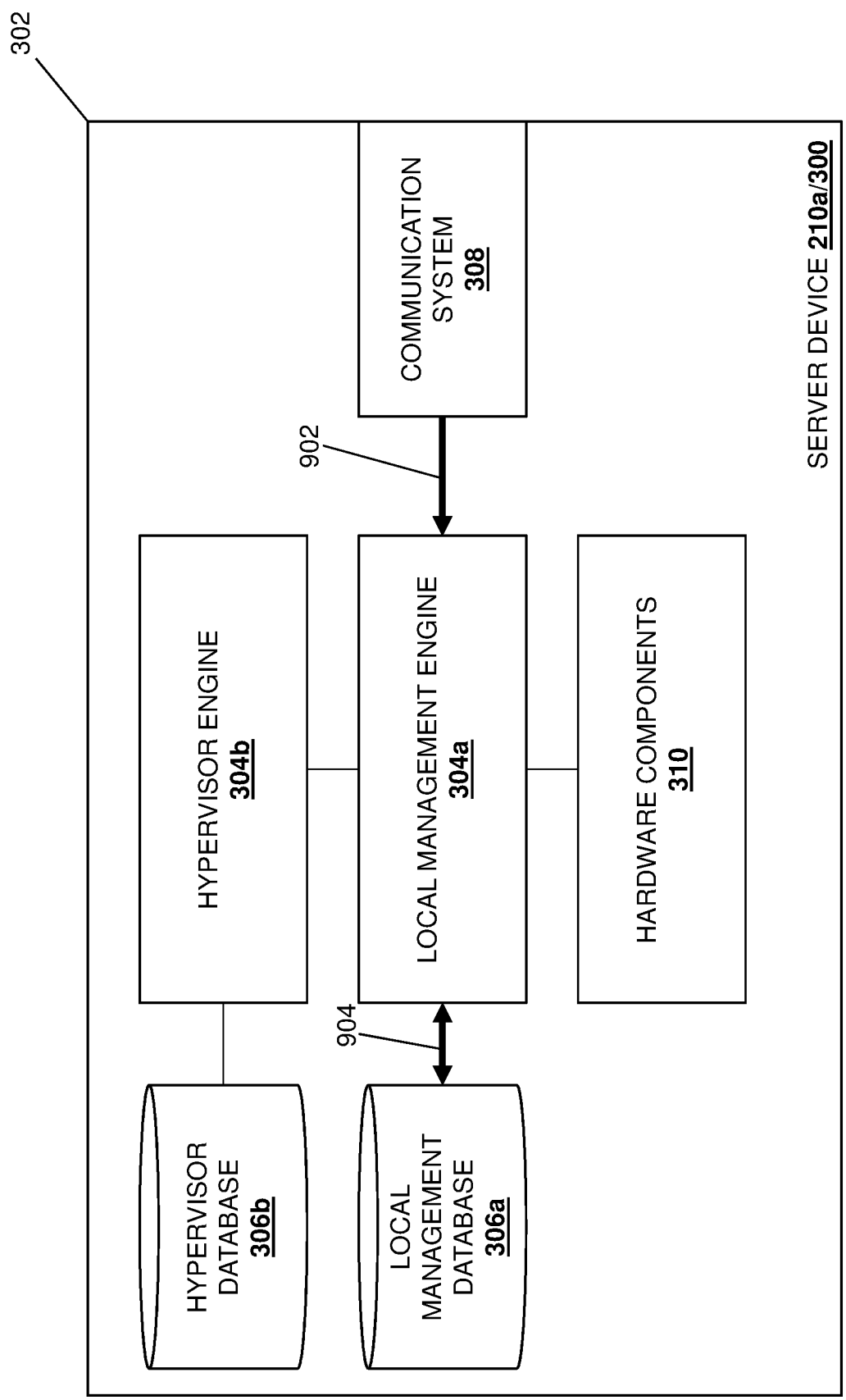

POWER/WORKLOAD MANAGEMENT SYSTEM

BACKGROUND

The present disclosure relates generally to information handling systems, and more particularly to managing power and workloads for information handling systems.

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Information handling systems such as, for example, server devices, networking devices, storage systems, and/or other computing devices are sometimes utilized (e.g., in datacenters) to perform workloads and store data associated with those workloads. For example, server devices may be configured to perform workloads and/or provide a Software Defined Storage (SDS) system that operates to store the data associated with those workloads. In such systems, device availability and data throughput are relatively important, and redundant and backup power systems are provided to ensure power for the server devices, while workload management systems are provided to ensure workload performance during reduced power situations. For example, conventional power/workload management systems operate to monitor datacenter infrastructure and, in the event of a reduced power situation, may operate to move workloads to particular server devices that will be provided power (e.g., via an Uninterruptible Power Supply (UPS) or other battery backup system), and reduce the power provided to other server devices (e.g., by configuring those server devices in a "hibernate" state). However, such conventional power/workload management systems suffer from a number of issues.

For example, conventional power/workload management systems require the designation/predefined allocation of server devices or other host devices to which workloads will be moved in the event of a reduced power situation. However, the inventors of the present disclosure have discovered that server devices that provide SDS systems may occasionally operate sub-optimally due to, for example, storage device errors (e.g., disk/sector errors), memory device errors (e.g., Dynamic Random Access Memory (DRAM) errors), cooling system malfunctions (e.g., fan device malfunctions), processing system errors (e.g., Central Processing Unit (CPU) errors or Graphics Processing Unit (GPU) errors), and/or other server device errors known in the art, which can cause those server devices to consume higher amounts of power than is necessary for workload performance (e.g., in response to the need for a processing system to perform extra processing cycles due to the storage device/memory device error, in response to the cooling system operating at a high speed due to the cooling system malfunctions, etc.). As such, in the event of a reduced power situation (e.g., when the datacenter has lost power and only UPS or battery backup power is available) and when one or more power-inefficient server devices have been pre-defined/designated to perform workloads during reduced power situations, the operation of other server devices that have been designated to perform workloads during the reduced power situation may be negatively affected, thus reducing the efficiency of the backup power system.

Accordingly, it would be desirable to provide a power/workload management system that addresses the issues discussed above.

SUMMARY

According to one embodiment, an Information Handling System (IHS) includes a processing system; and a memory system that is coupled to the processing system and that includes instructions that, when executed by the processing system, cause the processing system to provide a management engine that is configured to: identify a reduced power event associated with a power system; determine that a first computing device that is coupled to the power system is associated with a higher power consumption than a second computing device that is coupled to the power system; move, in response to determining that the first computing device is associated with the higher power consumption than the second computing device, the first workload to the second computing device such that the second computing device performs the first workload; and configure the first computing device in a reduced power consumption state.

BRIEF DESCRIPTION OF THE DRAWINGS

FIG. 7A is a schematic view illustrating an embodiment of the operation of the networked system of FIGS. 2A and 2B during the method of FIG. 5.

FIG. 9E is a schematic view illustrating an embodiment of the operation of the server device of FIG. 3 during the method of FIG. 8.

DETAILED DESCRIPTION

For purposes of this disclosure, an information handling system may include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, scientific, control, or other purposes. For example, an information handling system may be a personal computer (e.g., desktop or laptop), tablet computer, mobile device (e.g., personal digital assistant (PDA) or smart phone), server (e.g., blade server or rack server), a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, touchscreen and/or a video display. The information handling system may also include one or more buses operable to transmit communications between the various hardware components.

Figure 1:
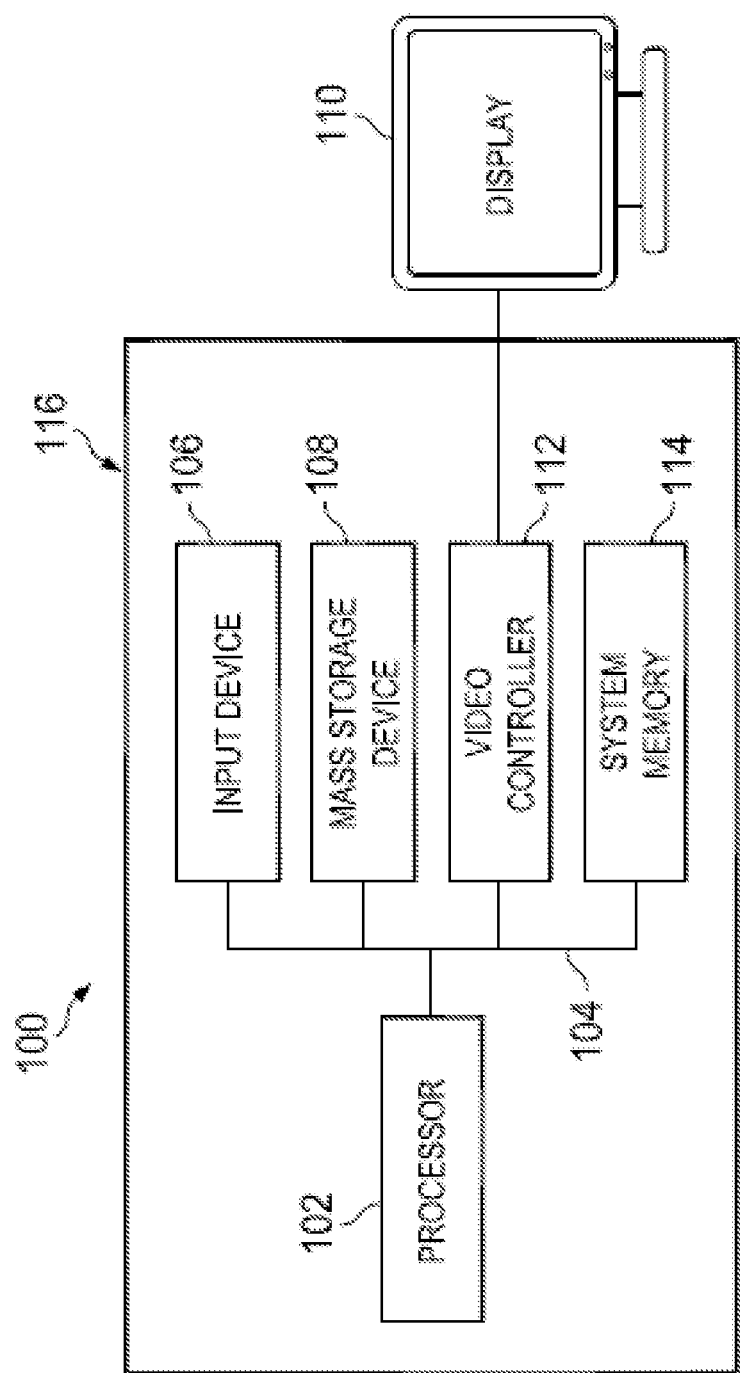
FIG. 1 is a schematic view illustrating an embodiment of an Information Handling System (IHS).

In one embodiment, IHS 100, FIG. 1, includes a processor 102, which is connected to a bus 104. Bus 104 serves as a connection between processor 102 and other components of IHS 100. An input device 106 is coupled to processor 102 to provide input to processor 102. Examples of input devices may include keyboards, touchscreens, pointing devices such as mouses, trackballs, and trackpads, and/or a variety of other input devices known in the art. Programs and data are stored on a mass storage device 108, which is coupled to processor 102. Examples of mass storage devices may include hard discs, optical disks, magneto-optical discs, solid-state storage devices, and/or a variety of other mass storage devices known in the art. IHS 100 further includes a display 110, which is coupled to processor 102 by a video controller 112. A system memory 114 is coupled to processor 102 to provide the processor with fast storage to facilitate execution of computer programs by processor 102. Examples of system memory may include random access memory (RAM) devices such as dynamic RAM (DRAM), synchronous DRAM (SDRAM), solid state memory devices, and/or a variety of other memory devices known in the art. In an embodiment, a chassis 116 houses some or all of the components of IHS 100. It should be understood that other buses and intermediate circuits can be deployed between the components described above and processor 102 to facilitate interconnection between the components and the processor 102.

Figure 2A:
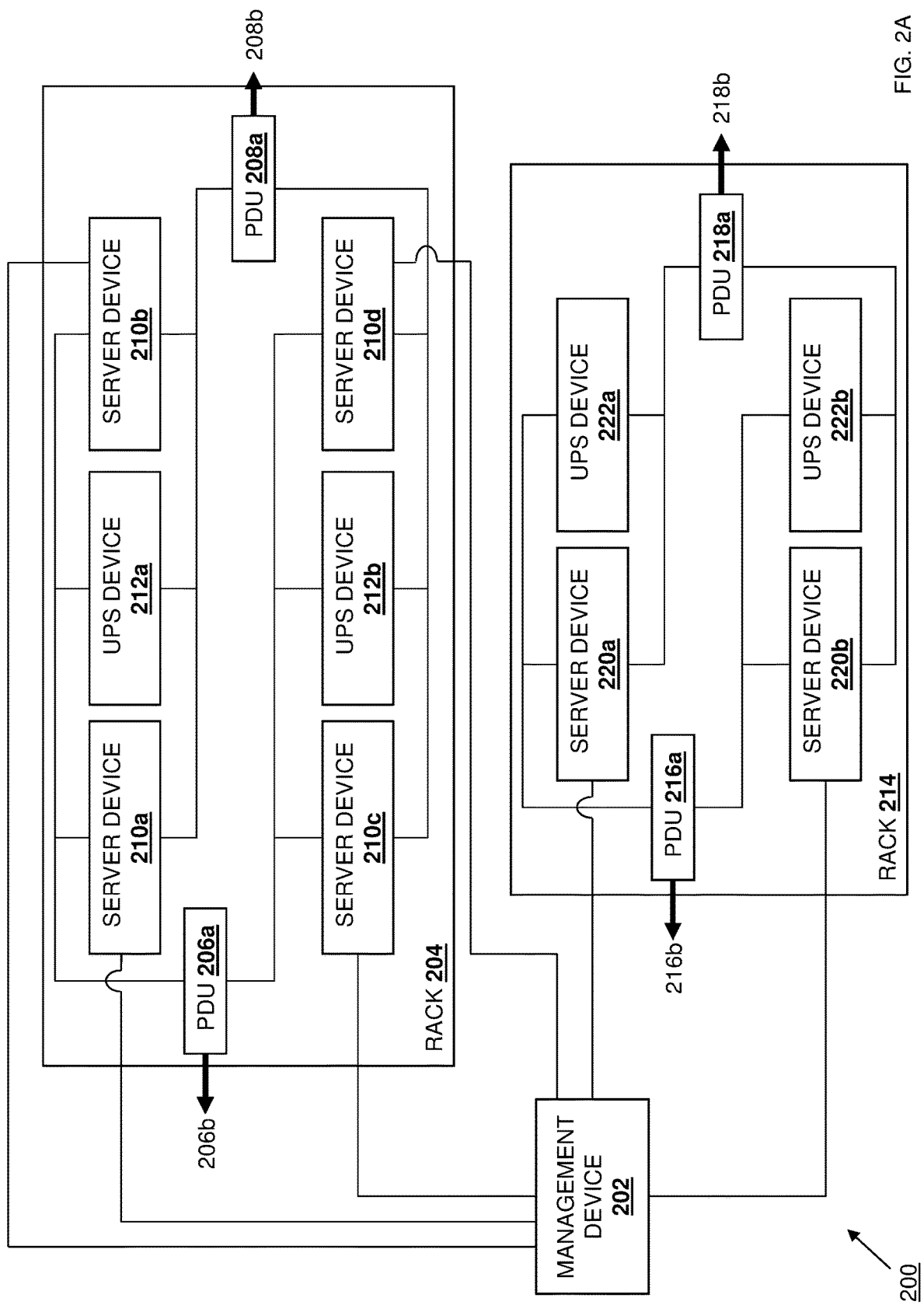
FIG. 2A is a schematic view illustrating an embodiment of a networked system.

Referring now to FIG. 2A, an embodiment of a networked system 200 is illustrated that may utilize the power/workload management system of the present disclosure. In the illustrated embodiment, the networked system 200 includes a management device 202. In an embodiment, the management device 202 may be provided by the IHS 100 discussed above with reference to FIG. 1, and/or may include some or all of the components of the IHS 100, and in specific examples may be provided by one or more server devices that operate as part of a "cloud" management system for the devices in the networked system 200. However, while illustrated and discussed as being provided by one or more server devices that operate as part of a cloud management system, one of skill in the art in possession of the present disclosure will recognize that management devices provided in the networked system 200 may include any devices that may be configured to operate similarly as discussed below.

In the illustrated embodiment, the networked system 200 includes a rack 204 that includes a power system that is provided by a Power Distribution Unit (PDU) 206a that is coupled to a power source 206b, and a PDU 208a that is coupled to a power source 208b. In an embodiment, the PDUs 206a and 208a may be provided by conventional PDUs, while in other embodiments the PDUs 206a and 208a may be provided by "intelligent/smart" PDUs that are configured to supply power data and/or metadata about power being utilized via those PDUs to connected devices for monitoring purposes. As will be appreciated by one of skill in the art in possession of the present disclosure, the PDUs/power sources 206a/206b and 208a/208b in the power system may be configured to provide separate, redundant power to the devices in the rack 204, and the power system may include a variety of other power components while remaining within the scope of the present disclosure as well. A plurality of server devices 210a, 210b, 210c, and 210 are located in the rack 204, with each of the server devices 210a-210d coupled to the management device 202, the PDU 206a, and the PDU 208a. However, while only server devices are illustrated as being included in the rack 204, one of skill in the art in possession of the present disclosure will appreciate how other computing devices (e.g., switch devices, storage systems, etc.) may be provided in the rack 204 while remaining within the scope of the present disclosure.

Furthermore, an Uninterruptible Power Supply (UPS) device 212a is coupled to each of the PDU 206a and the PDU 208a, and a UPS device 212b is coupled to each of the PDU 206a and the PDU 208a. As will be appreciated by one of skill in the art in possession of the present disclosure, the UPS devices 212a and 212b may be provided by battery backup systems that, as discussed below, are configured to supply power to the server devices 210a-210d (e.g., via the PDUs 206a and 208a) in the event power from the power sources 206b and 208b is reduced or becomes unavailable. In an embodiment, each of the UPS devices 212a and 212b may be include or be coupled to a processing system (e.g., a microcontroller) that is configured to propagate UPS-related information to connected devices using conventional interfaces. Furthermore, while a specific UPS device/server device connection configuration is illustrated, one of skill in the art in possession of the present disclosure will appreciate that UPS devices may be connected to server devices in order to provide backup power based on any of a variety of power requirements defined by a datacenter administrator.

In the illustrated embodiment, the networked system 200 also includes a rack 214 that includes a power system that is provided by a PDU 216a that is coupled to a power source 216b, and a PDU 218a that is coupled to a power source 218b. Similarly as discussed above, in some embodiments the PDUs 216a and 218a may be provided by conventional PDUs, while in other embodiments the PDUs 216a and 218a may be provided by "intelligent/smart" PDUs that are configured to supply power data and/or metadata about power being utilized via those PDUs to connected devices for monitoring purposes. Also similarly as described above, the PDUs/power sources 216a/216b and 218a/218b in the power system may be configured to provide separate, redundant power to the devices in the rack 214, and the power system may include a variety of other power components while remaining within the scope of the present disclosure as well. A plurality of server devices 220a and 220b are located in the rack 214, with each of the server devices 220a and 220b coupled to the management device 202, the PDU 216a, and the PDU 218a. However, while only server devices are illustrated as being included in the rack 214, one of skill in the art in possession of the present disclosure will appreciate how other computing devices (e.g., switch devices, storage systems, etc.) may be provided in the rack 214 while remaining within the scope of the present disclosure.

Furthermore, a UPS device 222a is coupled to each of the PDU 216a and the PDU 218a, and a UPS device 222b is coupled to each of the PDU 216a and the PDU 218a. Similarly as described above, the UPS devices 222a and 222b may be provided by battery backup systems that, as discussed below, are configured to supply power to the server devices 220a and 220b (e.g., via the PDUs 216a and 218a) in the event power from the power sources 216b and 218b is reduced or becomes unavailable. In an embodiment, each of the UPS devices 222a and 222b may include or be coupled to a processing system (e.g., a microcontroller) that is configured to propagate UPS-related information to connected devices using conventional interfaces. Furthermore, while a specific UPS device/server device connection configuration is illustrated, one of skill in the art in possession of the present disclosure will appreciate that UPS devices may be connected to server devices to provide backup power based on any of a variety of power requirements defined by a datacenter administrator.

Figure 2B:
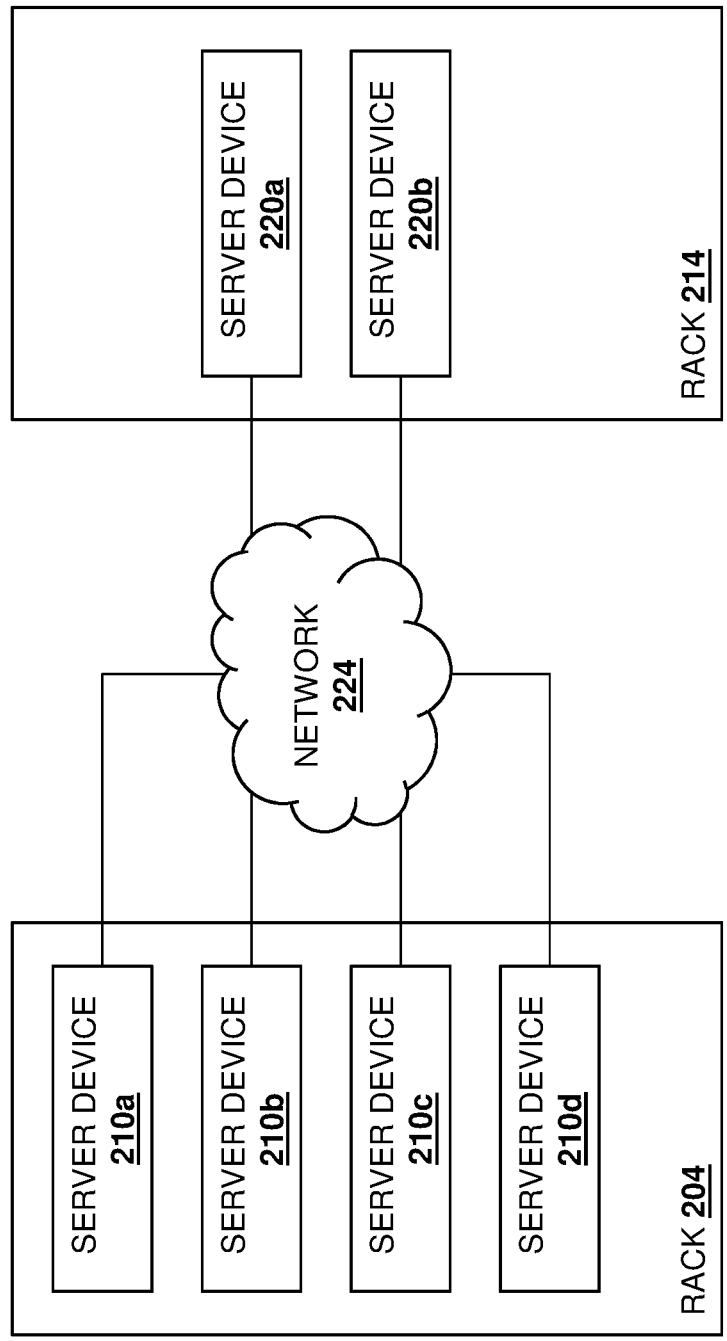
FIG. 2B is a schematic view illustrating an embodiment of the networked system of FIG. 2A.

As can be seen in FIG. 2B, each of the server devices 210a-210d in the rack 204 may be coupled to each other, as well as each of the server devices 220a and 220b in the rack 214, via a network 224 that may be provided by a variety of devices (e.g., switch devices), connections (e.g., cabling), and/or other networking techniques known in the art. Furthermore, as described in the examples below, the server devices 210a-210d, 220a, and 220b may be part of a server cluster, with one of the server devices (e.g., the server device 210a in the examples below) operating as a server cluster coordinator for the server cluster. For example, the server device that operates as the server cluster coordinator may be configured to manage the server cluster by performing workload assignments (e.g., using its hypervisor engine 304b), perform resource allocation, updates, heartbeat information configuration, and/or perform other cluster coordinator operations that would be apparent to one of skill in the art in possession of the present disclosure. As discussed below, the management device 202 and/or the server device 210a operating as the server cluster coordinator may provide a management subsystem for power spike event source identification system and power/workload management system discussed below. However, while a specific networked system 200 has been illustrated and described, one of skill in the art in possession of the present disclosure will recognize that the networked system of the present disclosure may include a variety of components and component configurations while remaining within the scope of the present disclosure as well.

Figure 3:
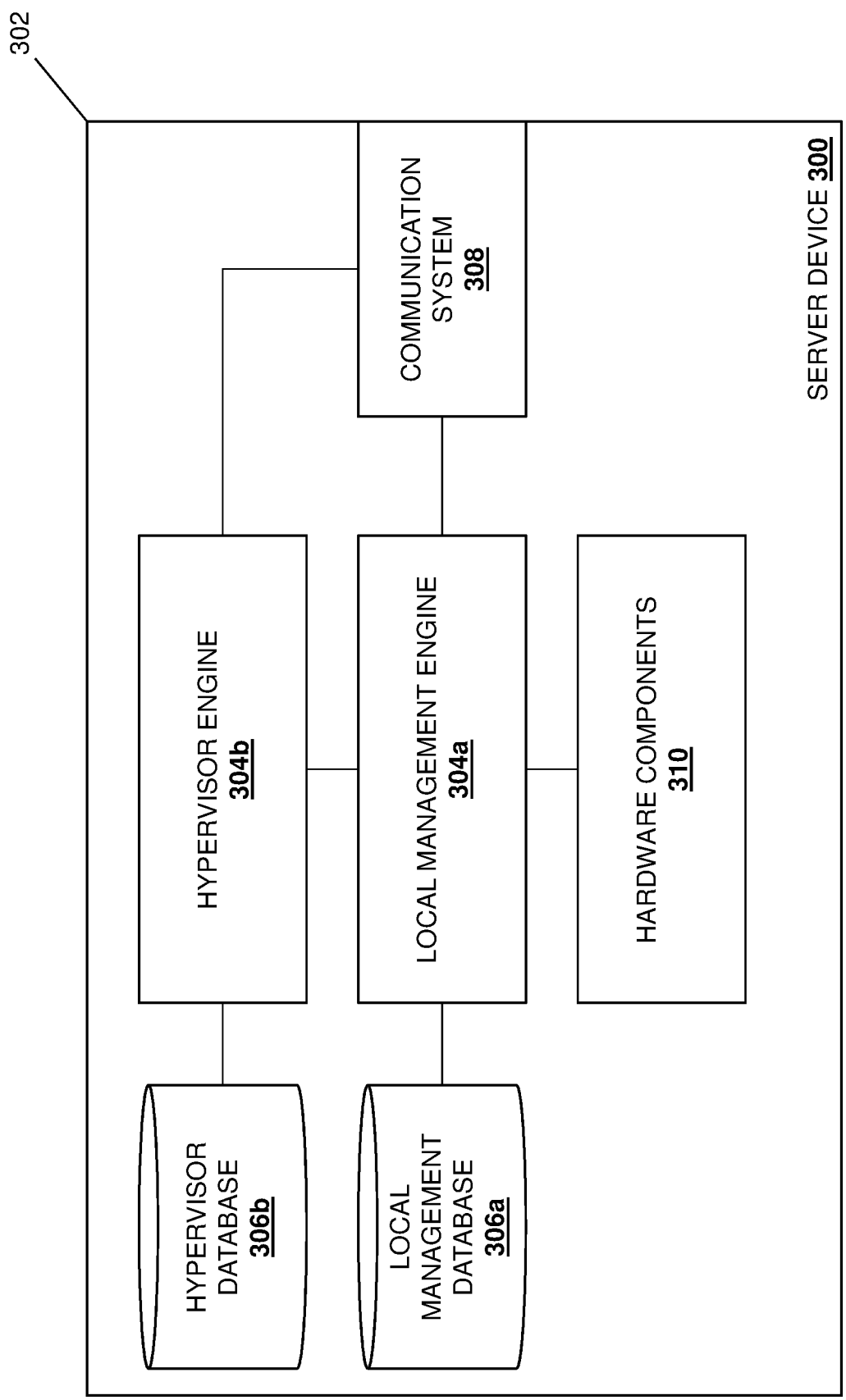
FIG. 3 is a schematic view illustrating an embodiment of a server device that may be provided in the networked system of FIGS. 2A and 2B.

Referring now to FIG. 3, an embodiment of a server device 300 is illustrated that may provide any or all of the server devices 210a-210d, 220a, and 220b discussed above with reference to FIG. 2. As such, the server device 300 may be provided by the IHS 100 discussed above with reference to FIG. 1 and/or may include some or all of the components of the IHS 100. Furthermore, while illustrated and discussed as being provided by a server device, one of skill in the art in possession of the present disclosure will recognize that the functionality of the server device 300 discussed below may be provided by other computing devices (e.g., switch devices, storage systems, etc.) that are configured to operate similarly as the server device 300 discussed below. In the illustrated embodiment, the server device 300 includes a chassis 302 that houses the components of the server device 300, only some of which are illustrated below.

For example, the chassis 302 may house a processing system (not illustrated, but which may include the processor 102 discussed above with reference to FIG. 1) and a memory system (not illustrated, but which may include the memory 114 discussed above with reference to FIG. 1) that is coupled to the processing system and that includes instructions that, when executed by the processing system, cause the processing system to provide a local management engine 304a that is configured to perform the functionality of the local management engines and/or server devices discussed below. In a specific example, the local management engine 304a may be provided as part of a management controller device in the server device 300 (e.g., including a management controller processing device that provides the local management engine 304a), which may be provided by an integrated DELL® Remote Access Controller (iDRAC) device available in server devices provided by DELL® Inc. of Round Rock, Tex., United States, a Baseboard Management Controller (BMC) device, and/or other management controller devices that would be apparent to one of skill in the art in possession of the present disclosure. However, one of skill in the art in possession of the present disclosure will appreciate how the local management engine 304a may be provided by other components in the server device 300 while remaining within the scope of the present disclosure as well. As discussed in further detail below, the local management engine 304a may retrieve power consumption information from the hardware components 310 in the server device 300, and may also identify and report hardware component errors, predict remaining expected lifetimes for the hardware components 310 (e.g., via a history of hardware component events exposed via an Application Programming Interface), and/or perform other management controller functionality that would be apparent to one of skill in the art in possession of the present disclosure.

The chassis 302 may also house a storage system (not illustrated, but which may include the storage 108 discussed above with reference to FIG. 1) that is coupled to the local management engine 304a (e.g., via a coupling between the storage system and the processing system) and that includes a local management database 306a that is configured to store any of the information utilized by the local management engine 304a discussed below. In a specific example, the local management database 306a may be provided as part of a management controller device in the server device 300, which may be provided by an iDRAC device available in server devices provided by DELL® Inc. of Round Rock, Tex., United States, a BMC device, and/or other management controller devices that would be apparent to one of skill in the art in possession of the present disclosure. However, one of skill in the art in possession of the present disclosure will appreciate how the local management database 306a may be provided by other components in the server device 300 while remaining within the scope of the present disclosure as well.

In addition, the memory system in the chassis 302 may include instructions that, when executed by the processing system (e.g., a Central Processing Unit (CPU)), cause the processing system to provide a hypervisor engine 304b that is configured to perform the functionality of the hypervisor engines and/or server devices discussed below. In an embodiment, the hypervisor engine 304b may be configured to manage virtual infrastructure in the networked system 200 by, for example, handling virtual machines provided by the server devices. For example, the hypervisor engine 304b may be configured to start and stop virtual machines provided by the server device 300, participate in virtual machine migration operations, and/or perform any other hypervisor operations that would be apparent to one of skill in the art in possession of the present disclosure. Furthermore, the storage system in the chassis 302 may be coupled to the hypervisor engine 304b (e.g., via a coupling between the storage system and the processing system) and may include a hypervisor database 306b that is configured to store any of the information utilized by the hypervisor engine 304b discussed below.

The chassis 302 may also house a communication system 308 that is coupled to the local management engine 304s and the hypervisor engine 304b (e.g., via a coupling between the communication system 308 and the processing system) and that may be provided by a Network Interface Controller (NIC), wireless communication systems (e.g., BLUETOOTH®, Near Field Communication (NFC) components, WiFi components, etc.), and/or any other communication components that would be apparent to one of skill in the art in possession of the present disclosure. As illustrated, the chassis 302 may also house a plurality of hardware components 310 that are coupled to the local management engine 304a and that may include cooling system components (e.g., fan devices), storage devices (e.g., hard disk drives), memory devices (e.g., DRAM devices), graphics processing systems (e.g., Graphics Processing Units (GPUs)), and/or any other hardware components that would be apparent to one of skill in the art in possession of the present disclosure. However, while a specific server device 300 has been illustrated, one of skill in the art in possession of the present disclosure will recognize that server devices (or other devices operating according to the teachings of the present disclosure in a manner similar to that described below for the server device 300) may include a variety of components and/or component configurations for providing conventional server device functionality, as well as the functionality discussed below, while remaining within the scope of the present disclosure as well.

Figure 4:
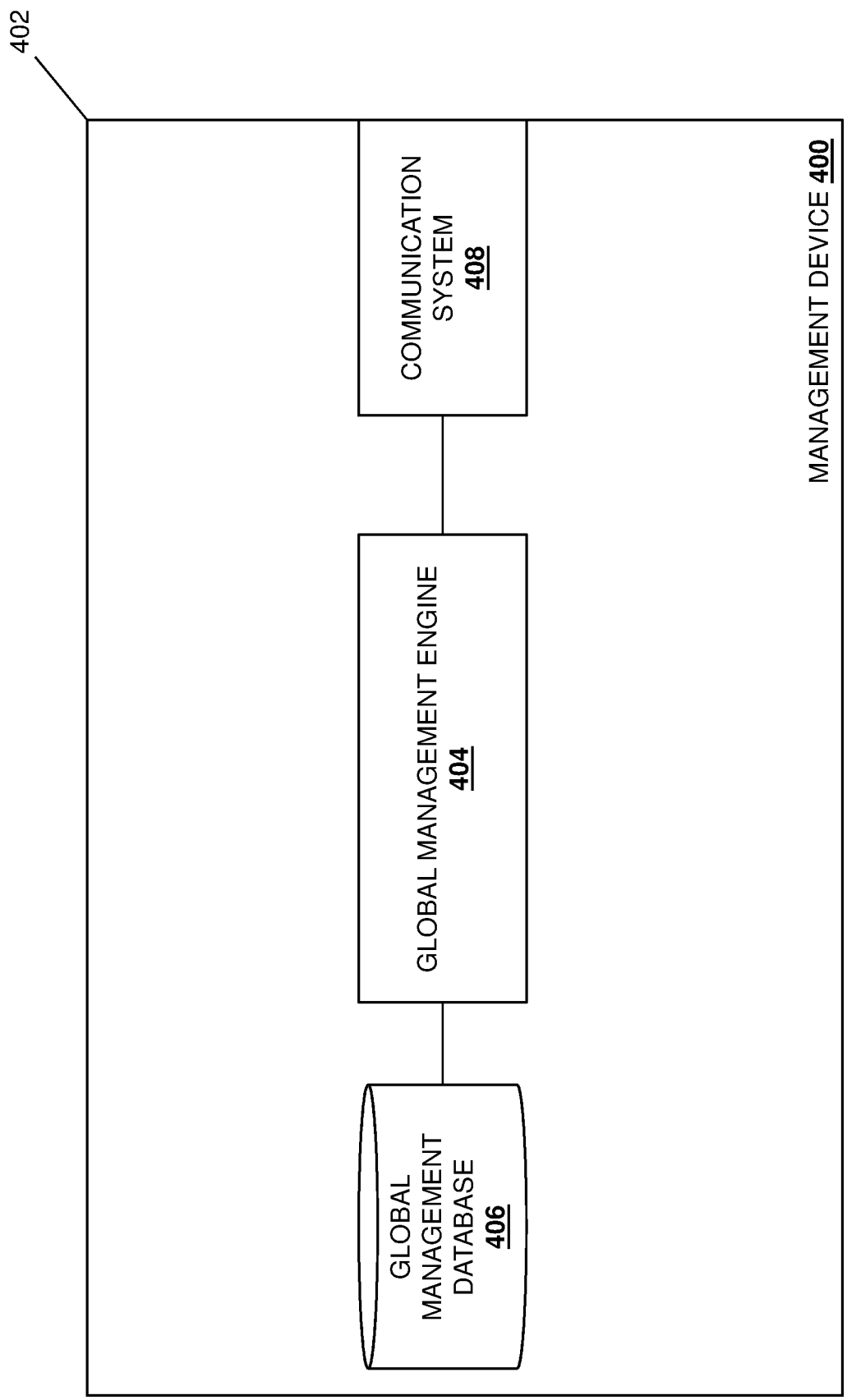
FIG. 4 is a schematic view illustrating an embodiment of a management device that may be provided in the networked system of FIGS. 2A and 2B.

Referring now to FIG. 4, an embodiment of a management device 400 is illustrated that may provide the management device 202 discussed above with reference to FIG. 2. As such, the management device 400 may be provided by the IHS 100 discussed above with reference to FIG. 1 and/or may include some or all of the components of the IHS 100, and in specific examples may be provided by one or more server devices configured to provide a "cloud" management system. However, while illustrated and discussed as being provided by one or more server devices, one of skill in the art in possession of the present disclosure will recognize that the functionality of the management device 400 discussed below may be provided by other devices that are configured to operate similarly as the management device 400 discussed below. In the illustrated embodiment, the management device 400 includes a chassis 402 that houses the components of the management device 400, only some of which are illustrated below. For example, the chassis 402 may house a processing system (not illustrated, but which may include the processor 102 discussed above with reference to FIG. 1) and a memory system (not illustrated, but which may include the memory 114 discussed above with reference to FIG. 1) that is coupled to the processing system and that includes instructions that, when executed by the processing system, cause the processing system to provide a global management engine 404 that is configured to perform the functionality of the global management engines and/or management devices discussed below. In a specific example, the global management engine 404 may provide a management layer for the networked system 200, and may operate to receive/collect alerts, events, and/or other notifications provided by the networked system infrastructure (e.g., the server devices and power system components in the examples below), as well as use any of that data in the power spike event source identification determinations and/or power/workload management decisions described below.

The chassis 402 may also house a storage system (not illustrated, but which may include the storage 108 discussed above with reference to FIG. 1) that is coupled to the global management engine 404 (e.g., via a coupling between the storage system and the processing system) and that includes a global management database 406 that is configured to store any of the information utilized by the global management engine 404 discussed below. The chassis 402 may also house a communication system 408 that is coupled to the global management engine 404 (e.g., via a coupling between the communication system 408 and the processing system) and that may be provided by a Network Interface Controller (NIC), wireless communication systems (e.g., BLU- ETOOTH®, Near Field Communication (NFC) components, WiFi components, etc.), and/or any other communication components that would be apparent to one of skill in the art in possession of the present disclosure. However, while a specific management device 400 has been illustrated, one of skill in the art in possession of the present disclosure will recognize that management devices (or other devices operating according to the teachings of the present disclosure in a manner similar to that described below for the management device 300) may include a variety of components and/or component configurations for providing conventional management device functionality, as well as the functionality discussed below, while remaining within the scope of the present disclosure as well.

As discussed above, any server device in the networked system 200 (e.g., the server device 210a in the examples below that operates as the server cluster coordinator) may provide a management subsystem that operates in cooperation with the management device 202 to perform the power spike event source identification and/or power/workload management functionality described below. In some embodiments, the UPS devices 212a, 212b, 222a, and 222b may be utilized along with the local management engines 304a in the server devices 300 (e.g., which may be provided by management controller devices) in order to provide power management, with UPS device data synchronized with the management device 202 directly or via one or more of the server devices. For example, the management device 202 may be coupled to the UPS devices 212a, 212b, 222a, and 222b in a manner that allows for remote power management, with the UPS devices 212a, 212b, 222a, and 222b configured to transmit events, alerts, and/or power information updates to the management device 202 (e.g., via the Simple Network Management Protocol (SNMP), a Data Center Infrastructure Management (DCIM) interface, etc.) in order to allow for power management operations.

In some embodiments, conventional components may connect the PDUs 206a, 208a, 216a, and 218a and UPS devices 212a, 212b, 222a, and 222b to the server devices 210a-210d, 222a, and 222b, which allows the server devices 210a-210d, 222a, and 222b to communicate server device information, UPS device information, and PDU information to the management device 202. With regard to the server devices, the hypervisor engine 304b and the local management engine 304a (e.g., which may be provided by a management controller device) may communicate via a sideband interface such as the Intelligent Platform Management Interface (IPMI), a Universal Serial Bus-Network Interface Controller (USB-NIC) passthrough, or other communication interface known in the art.

As discussed below, hardware power-related data generated by the hardware components 310 is the server devices may be collected by the local management engine 304a (e.g., which may be provided by a management controller device) in that server device, and may be pushed via an operating system running in that server device to the hypervisor engine 304b in that server device, which allows that hardware power-related data to be communicated to and/or synchronized with the management device 202 as discussed in below. The management device 202 and server device 210a operating as the server cluster coordinator in the examples below may then utilize that hardware power-related data to manage workloads on the server devices in the server cluster, and may be used to generate a power preference table that indicates preferred server devices to which power should be provided based on hardware errors in those server devices and/or other performance indicators for those server devices. Furthermore, the hardware power-related data may be utilized by the management device 202 and server device 210a operating as the server cluster coordinator in the examples below to assign workloads to server devices that utilize power most efficiently and, in the case of a reduced power event, may utilize that hardware power-related data to move workloads from power-inefficient server devices to power-efficient server devices so the power-inefficient server devices may be configured in a reduced power consumption state.

Furthermore, in power cycle or power reduction situations, the UPS devices may notify the management device 202 of the power situation via a conventional interface (e.g., using SNMP, Secure Shell (SSH), Representational State Transfer (REST), etc.), and the management device 202 may then notify the server device 210a operating as the server cluster coordinator in the examples below so that server device/server cluster coordinator may then generate a priority list of server devices for configuration in a reduced power consumption state. In an embodiment, the priority list of server devices for configuration in a reduced power consumption state may be based on a data synchronization state of the server devices that one of skill in the art in possession of the present disclosure will recognize provides for continuous data synchronization in a software defined storage system as part of data mirroring operations that do not consider the power state of system and, as such, may operate to reduce the occurrence of data corruption scenarios between storage devices in the server devices.

As will be appreciated by one of skill in the art in possession of the present disclosure, when server devices in a server cluster utilize different PDUs and UPS devices, power data (e.g., power consumption information) from those PDUs and UPS devices may be collected at the management device 202 (e.g., via DCIM interfaces and the SNMP), which allows the management device 202 to provide for enhanced detection of faults in the networked system 200. For example, such fault detection may operate via the local management engine 304a (e.g., which may be provided by a management controller device) and operating system in the server devices collecting hardware operation data and generating alerts in the event of unexpected hardware behavior (e.g., indicating reduced performance of DRAM memory devices, hard disk drives, fan devices, etc.), and that hardware operation data may also be shared with the management device 202 and the server device 210a operating as the server cluster coordinator in the examples below. The local management engine 304a in the server devices may also collect power consumption information from its hardware components and share that power consumption information with the server device 210a operating as the server cluster coordinator in the examples below, as well as with the management device 202.

As such, the management device 202 may maintain a matrix that relates hardware components errors/faults for hardware components in server devices (e.g., fan device faults, hard disk drive faults, DRAM memory device faults, GPU faults, etc.), and power consumption by those hardware components and/or their server device. Thus, in the case of power spike events, the management device 202 may review time-series data to identify the faults in the networked system 200 that may be the cause of that power spike event, which may allow the "blacklisting" or denial of power to server devices and/or their faulty hardware components, and the conveying of that information to the server device 210a operating as the server cluster coordinator in the examples below so that workloads being performed by those server devices may be moved to other server devices that utilize power more efficiently.

Figure 5:
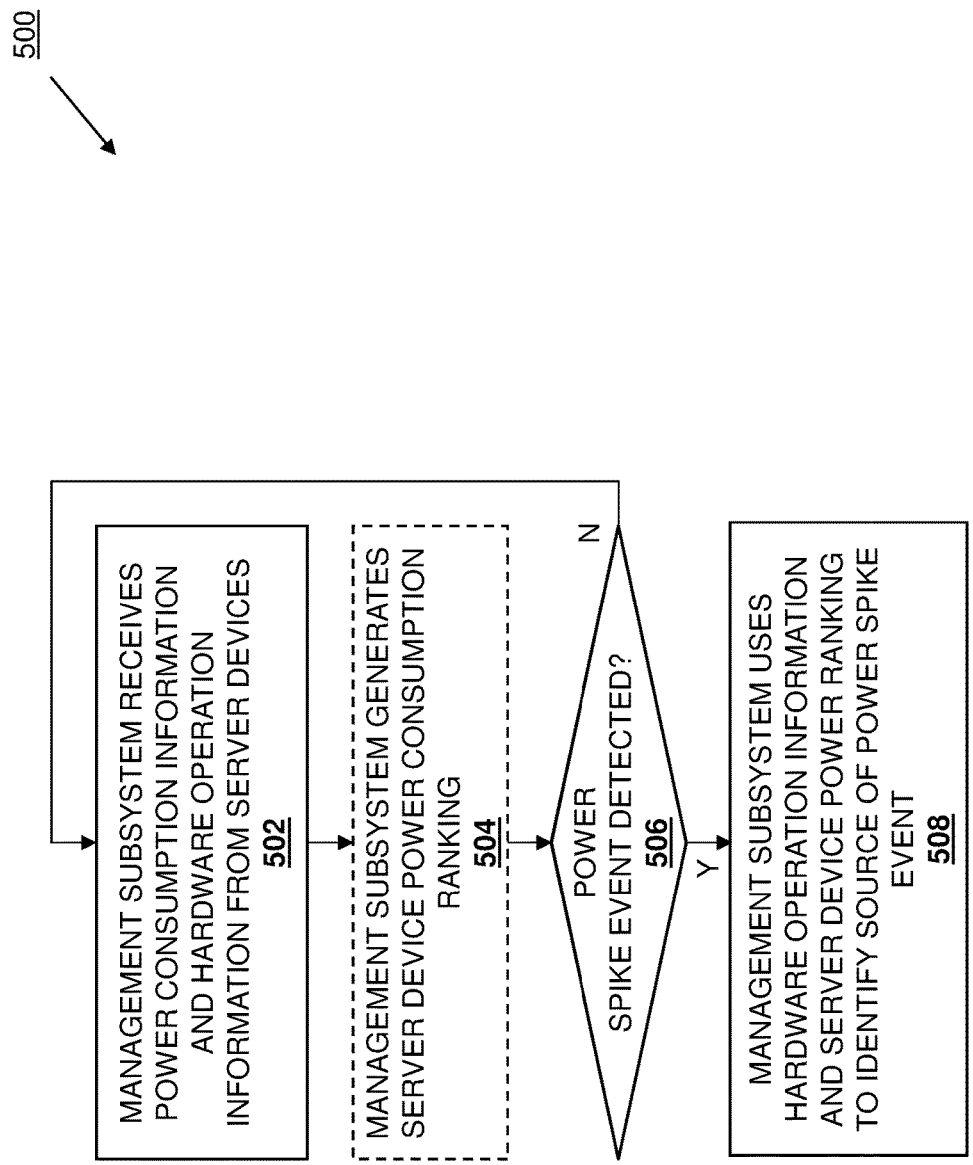
FIG. 5 is a flow chart illustrating an embodiment of a method for identifying a source of a power spike event.

Referring now to FIG. 5, an embodiment of a method 500 for identifying a source of a power spike event is illustrated. As discussed below, the systems and methods of the present disclosure provide for the collection of power consumption information from server devices for the generation of a server device power consumption ranking that is indicative of the power consumption history, and the collection of hardware component operation information from the server devices for the determination of the corresponding health of the hardware in those server devices, and in the event of a power spike event associated with the power system, the power consumption ranking and hardware component operation information may be utilized to identify one or more sources of the power spike event.

Figure 6A:
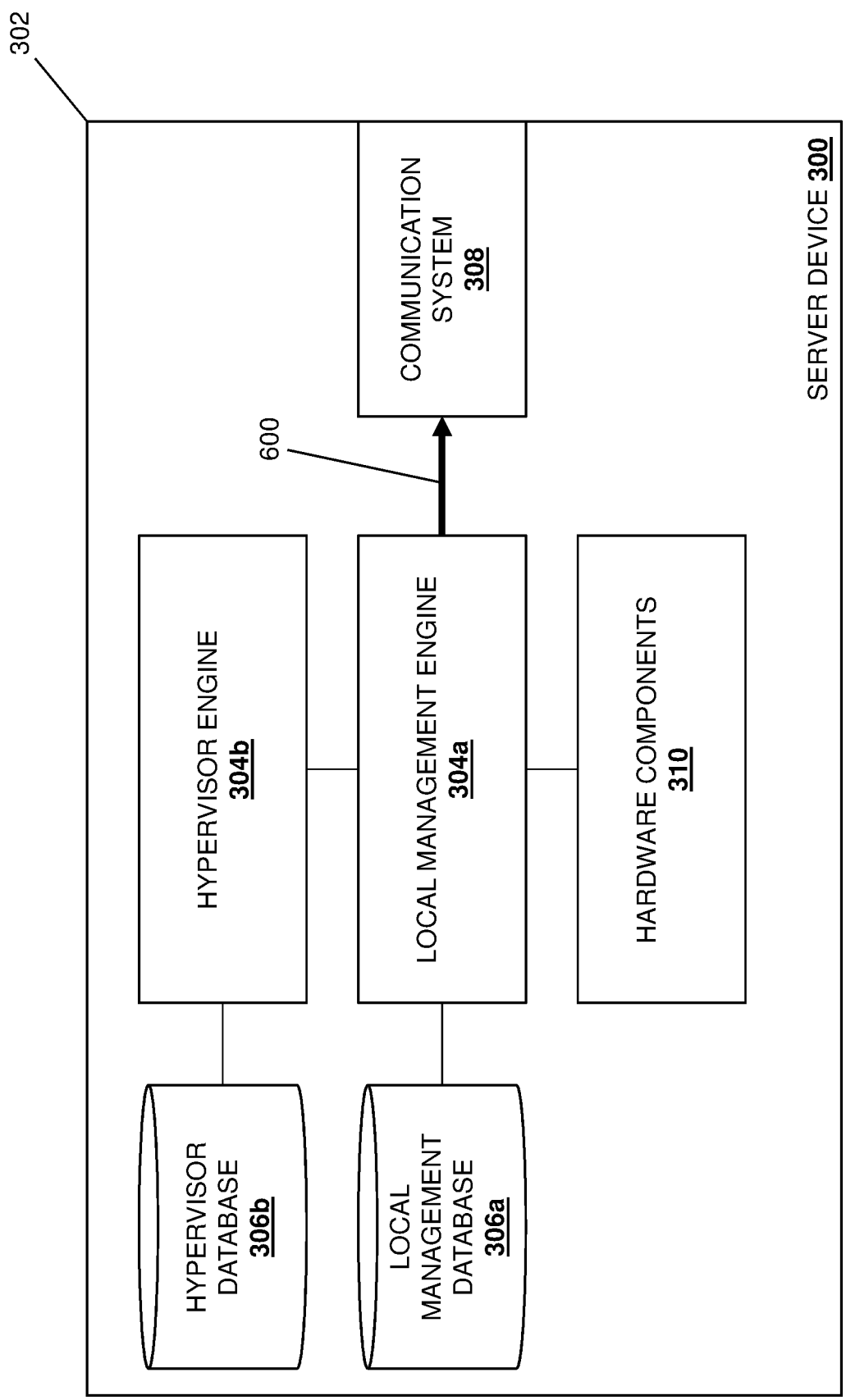
FIG. 6A is a schematic view illustrating an embodiment of the operation of the server device of FIG. 3 during the method of FIG. 5.
Figure 6B:
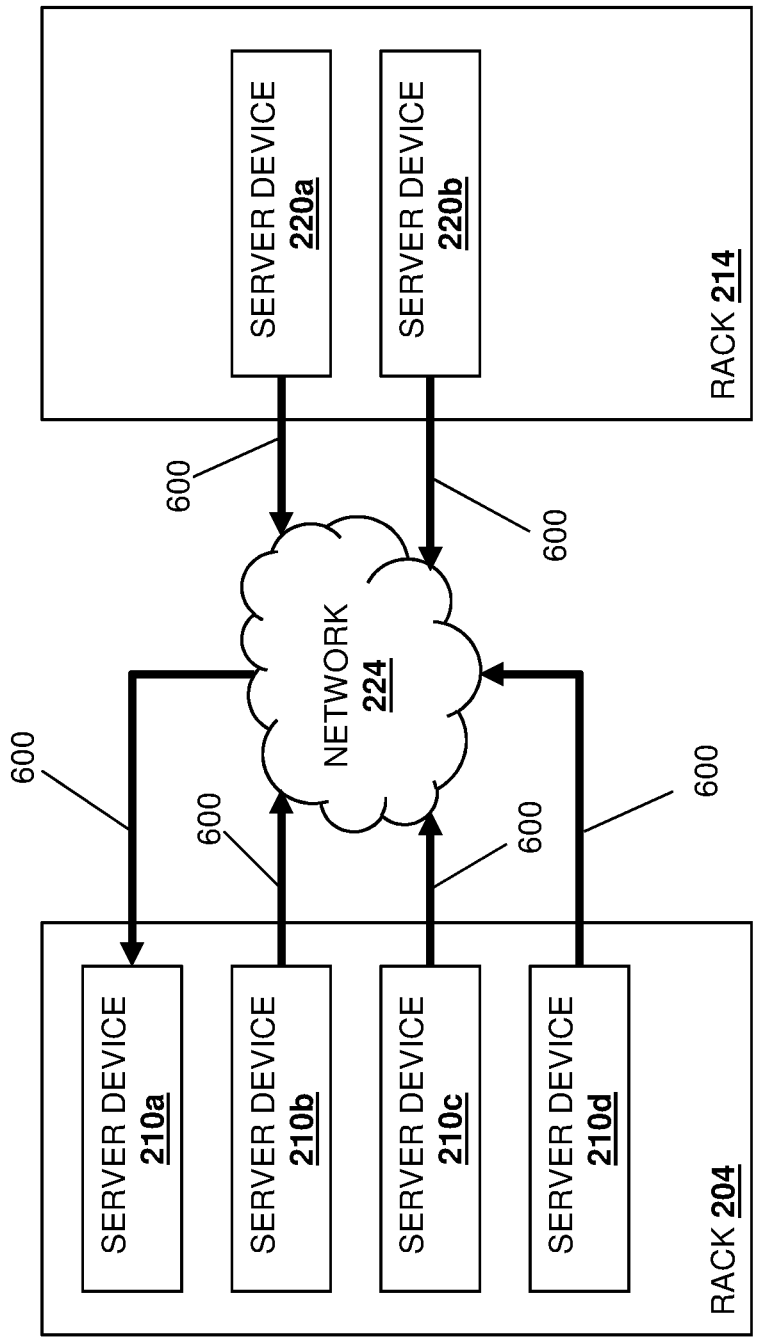
FIG. 6B is a schematic view illustrating an embodiment of the operation of the networked system of FIGS. 2A and 2B during the method of FIG. 5.
Figure 6C:
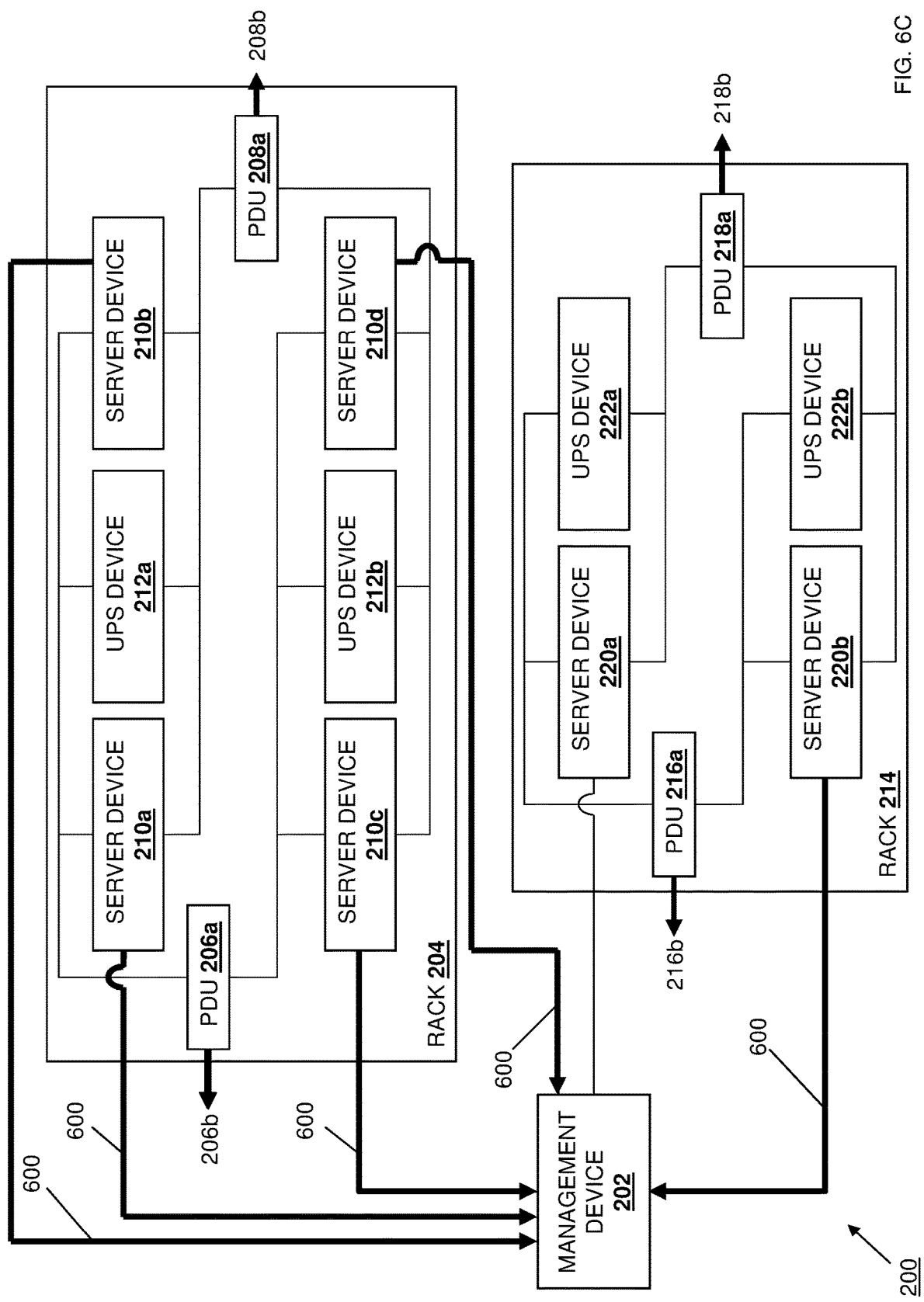
FIG. 6C is a schematic view illustrating an embodiment of the operation of the networked system of FIGS. 2A and 2B during the method of FIG. 5.

The method 500 begins at block 502 where a management subsystem receives power consumption information and hardware operation information from server devices. With reference to FIGS. 6A, 6B, and 6C, in an embodiment of block 502, the local management engine 304a in each server device 300 (e.g., provided by a management controller device in that server device) may perform power consumption information/hardware operation information transmission operations 600 that include determining power consumption information that identifies the amount of power being consumed by that server device, and hardware operation information that identifies operation details of the hardware components 310 in that server device, and transmitting that power consumption information and hardware operation information to the server device that is operating as the server cluster coordinator (e.g., the server device 210a in this example), as well as to the management device 202.

In an embodiment, the power consumption information may be determined for each server device using a variety of power consumption determination techniques known in the art (e.g., via BMC device telemetry information), and may include a total amount of power being consumed by that server device, amounts of power being consumed by the different hardware components 310 in that server device, and/or any other power consumption information that would be apparent to one of skill in the art in possession of the present disclosure. In an embodiment, the hardware operation information may be determined for each server device using a variety of hardware operation determination techniques known in the art (e.g., via BMC device telemetry information), and may include telemetry information for each of hardware components 310 in that server device, alerts/events/notifications generated by each of those hardware components 310, and/or any other hardware operation information that would be apparent to one of skill in the art in possession of the present disclosure. In a specific example, the hardware operation information determined for each server device may identify a variety of details about the operation of storage device(s) in that server device, the operation of memory device(s) in that server device, the operation of a cooling system in that server device, the operation of a processing system in that server device, and/or other information about any other hardware components that would be apparent to one of skill in the art in possession of the present disclosure.

Figure 6D:
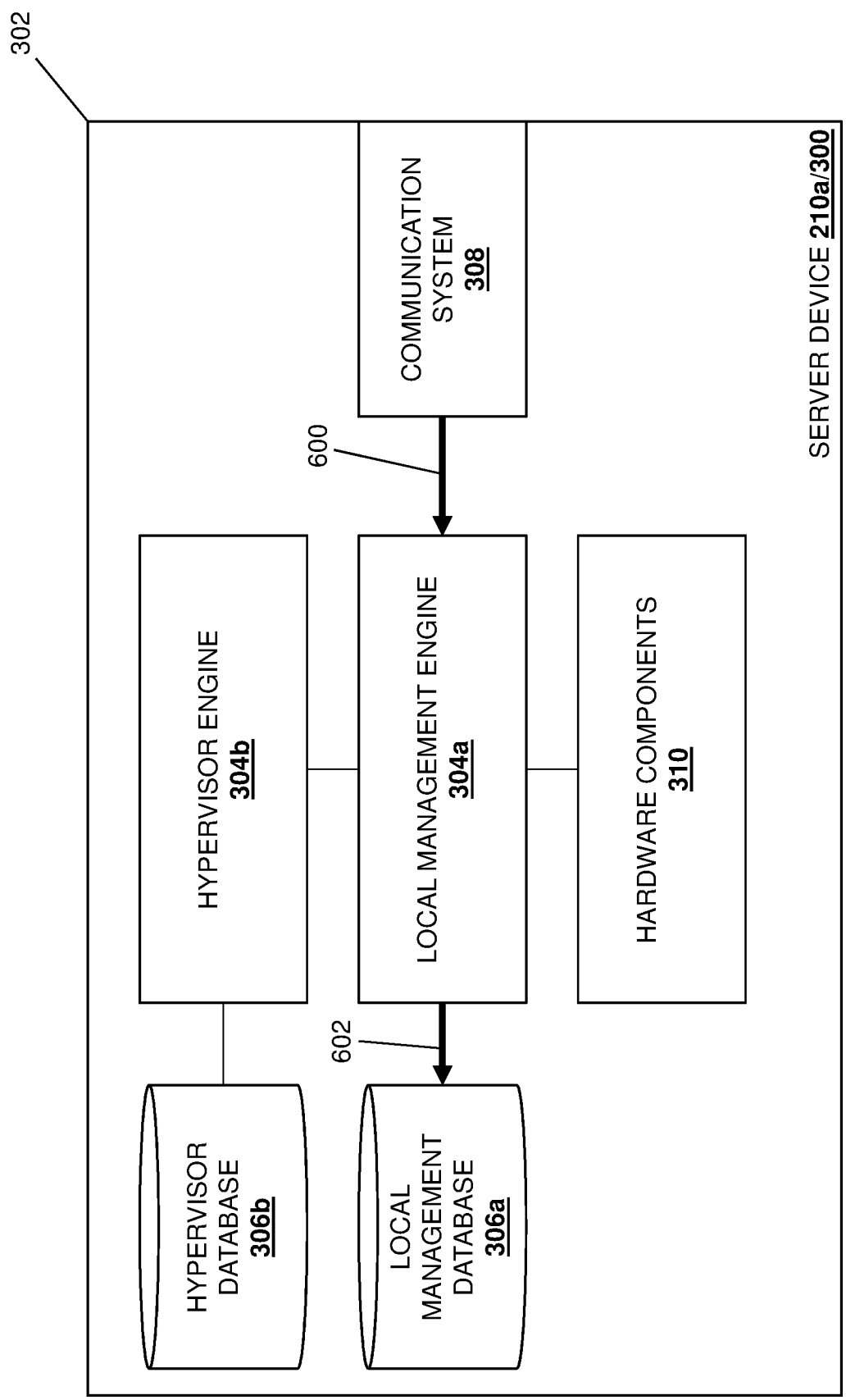
FIG. 6D is a schematic view illustrating an embodiment of the operation of the server device of FIG. 3 during the method of FIG. 5.
Figure 6E:
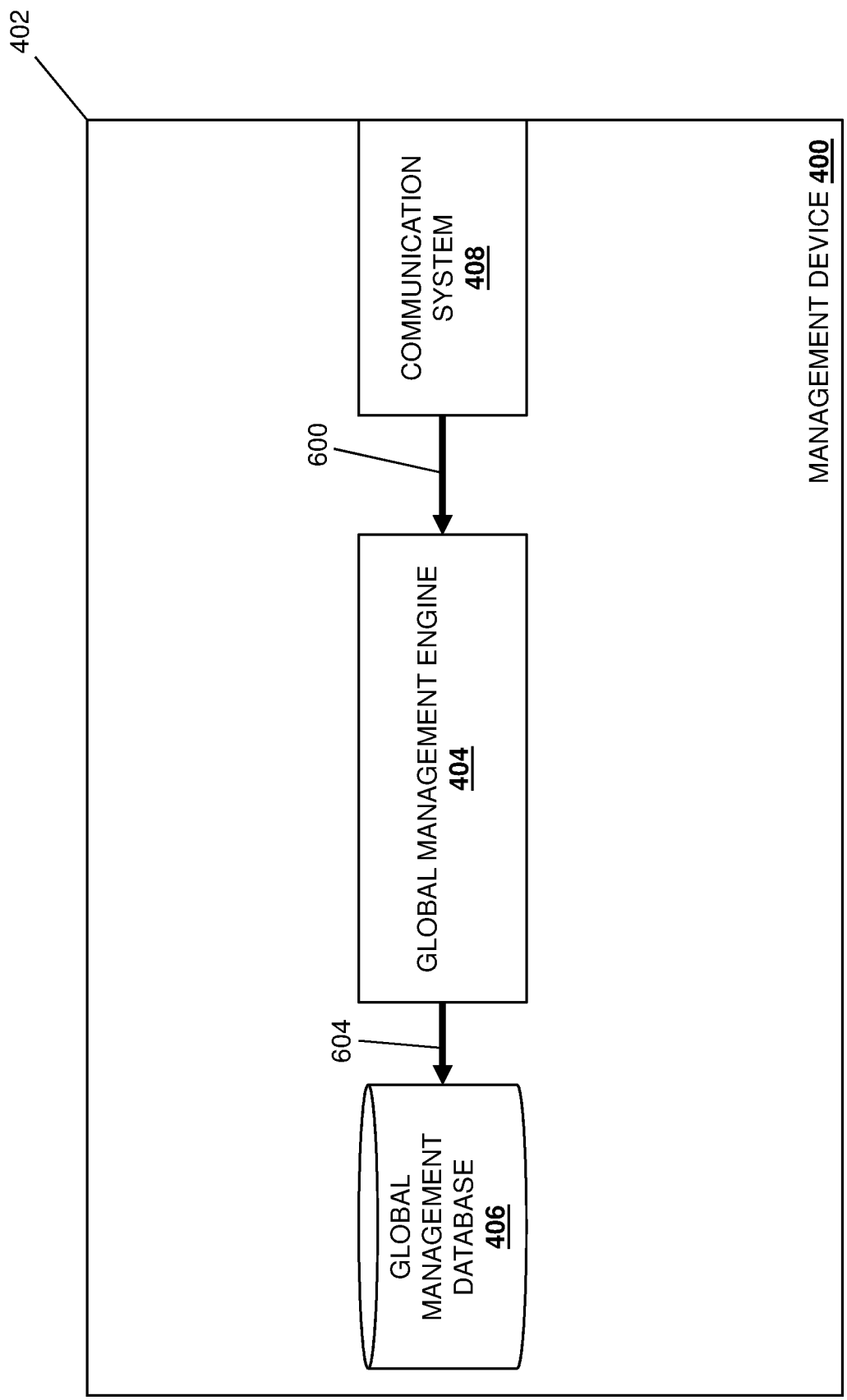
FIG. 6E is a schematic view illustrating an embodiment of the operation of the management device of FIG. 4 during the method of FIG. 5.

As such, with reference to FIG. 6D and as part of the power consumption information/hardware operation information transmission operations 600, the local management engine 304a in the server device 210a/300 (which is operating as the server cluster coordinator in this example) may receive the power consumption information and hardware operation information from the other server devices, and perform power consumption information/hardware operation information storage operations 602 to store the power consumption information and hardware operation information in its local management database 306a. Similarly, with reference to FIG. 6E and as part of the power consumption information/hardware operation information transmission operations 600, the global management engine 404 in the management device 202/400 may receive the power consumption information and hardware operation information from the server devices, and perform power consumption information/hardware operation information storage operations 604 to store the power consumption information and hardware operation information in its global management database 406. As such, each of the server device 210a/300 (which is operating as the server cluster coordinator in this example) and the management device 202 may maintain a history of hardware component operation (via the hardware operation information) and power consumption (via the power consumption information) for each of the server devices 210a-210d, 220a, and 220b, and that hardware component operation and power consumption history for each server device 210a-210d, 220a, and 220b may be updated periodically (e.g., on subsequent iterations of the method 500)

The method 500 then proceeds to optional block 504 where the management subsystem may generate a server device power consumption ranking. In an embodiment, at block 504, the local management engine 304a in the server device 210a/300 (which is operating as the server cluster coordinator in this example) and/or the global management engine 404 in the management device 202/400 (either or both of which may provide the management subsystem in the power spike event source identification system of the present disclosure) may operate to use the power consumption information received at block 502 to generate a server device power consumption ranking. In an embodiment, the server device power consumption ranking may provide a ranking of the server devices 210a-210d, 220a, and 220b by their power consumption, power consumption pattern, and/or any other power consumption information that would be apparent to one of skill in the art in possession of the present disclosure. As such, the server device power consumption ranking may identify which of the server devices 210a-210d, 220a, and 220b are consuming relatively more power, and which of the server devices 210a-210d, 220a, and 220b are consuming relatively less power.

Figure 6F:
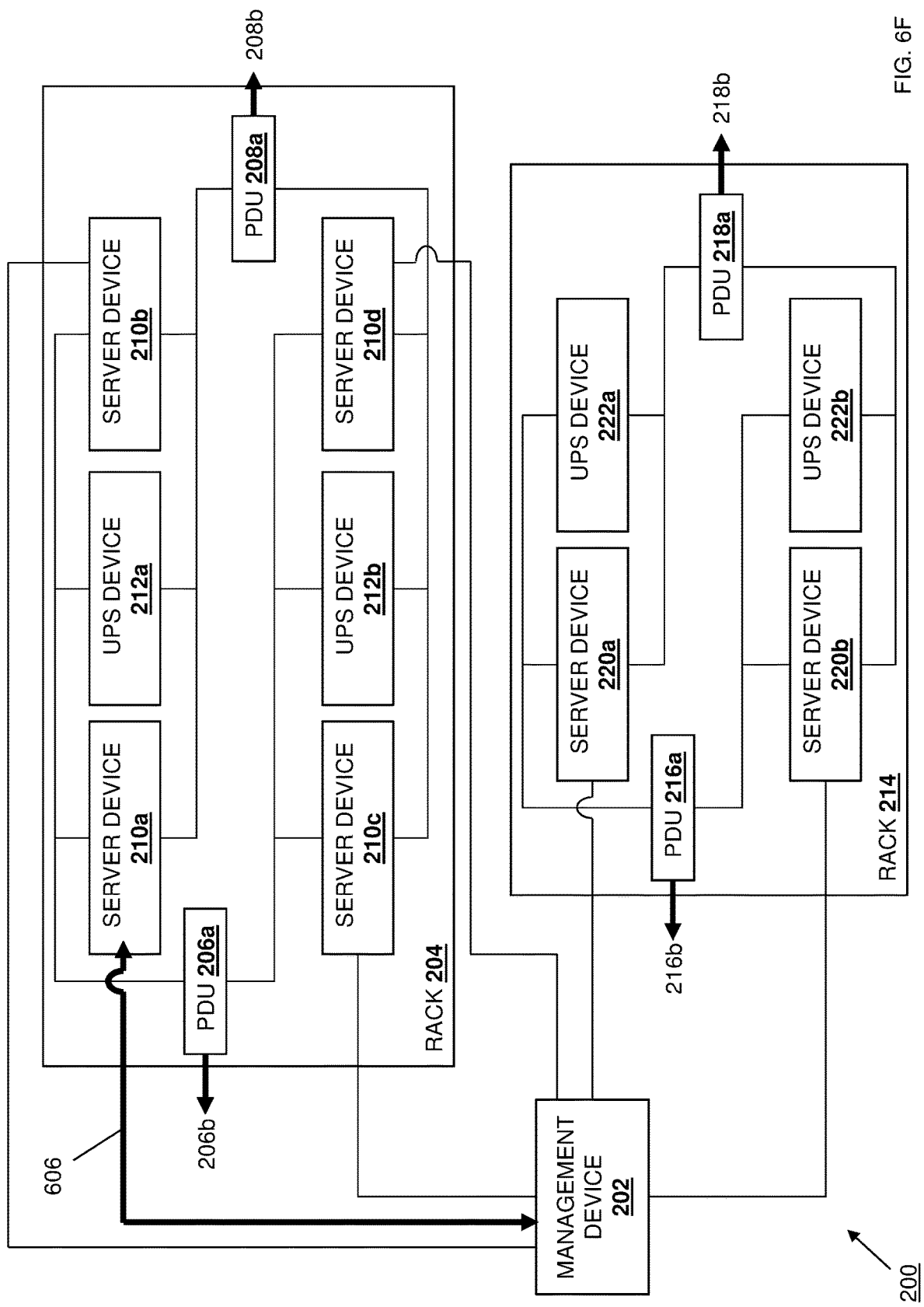
FIG. 6F is a schematic view illustrating an embodiment of the operation of the networked system of FIGS. 2A and 2B during the method of FIG. 5.

With reference to FIG. 6F, in some embodiments of block 504, the local management engine 304a in the server device 210a (which is operating as the server cluster coordinator in this example) and the global management engine 404 in the management device 202/400 may perform synchronization operations 606 in order to synchronize the server device power consumption ranking generated at block 504. As such, one of skill in the art in possession of the present disclosure will appreciate how block 504 may be optional in that the server device power consumption ranking need only be performed by one of the server cluster coordinator (e.g., the server device 210a in this example) and the management device 202 (and then subsequently synchronized with the other), due to the fact that subsequent iterations of the method 500 may not require a re-generation of the server device power consumption ranking (e.g., when power consumption data has not substantially changed), and for a variety of other reasons as well.

The method 500 then proceeds to decision block 506 where it is determined whether a power spike event has been detected. In an embodiment, at decision block 506, the PDUs 206*a*, 208*a*, 216*a*, and/or 218*a*, and/or the server devices 210*a*-210*d*, 220*a*, and 220*b* may monitor for power spike events associated with their power systems. In some examples, the PDUs 206*a*, 208*a*, 216*a*, and/or 218*a* may be configured to monitor for and detect power spike events in their power system (e.g., power consumption increases in the power system that are greater than a predefined power consumption increase threshold) and, in response, report the power spike events to the management device 202. In other examples, the server devices 210*a*-210*d*, 220*a*, and 220*b* may be configured to monitor for and detect power spike events in their power system (e.g., power consumption increases in the power system that are greater than a predefined power consumption increase threshold) and, in response, report the power spike events to the management device 202. As such, any of the PDUs 206*a*, 208*a*, 216*a*, and/or 218*a* and/or the server devices 210*a*-210*d*, 220*a*, and 220*b* may be configured to perform a variety of power consumption monitoring operations that one of skill in the art in possession of the present disclosure would recognize as allowing for the detection of power spike events (e.g., by the BMC device telemetry) in a power system.

If, at decision block 506, it is determined that a power spike event has not been detected, the method 500 returns to block 502. As such, the method 500 may loop such that the server devices determine and transmit power consumption information and/or hardware operation information to the server cluster coordinator and/or the management device, the server cluster coordinator and/or the management device optionally update (and/or synchronize) the server device power consumption ranking (if necessary), and the PDUs and/or server devices monitor for power spike events as long as a power spike event does not occur.

If at decision block 506, it is determined that a power spike event has been detected, the method 500 proceeds to block 508 where the management subsystem uses the hardware operation information and the server device power ranking to identify a source of the power spike event. With reference to FIG. 7A, in an embodiment of decision block 506, the local management engine 304*a* in the server device 210*a* may detect the power spike event and, in response, may perform power spike event reporting operations 700 in order to report that power spike event to the management device 202. As will be appreciated by one of skill in the art in possession of the present disclosure, the report of the power spike event may be provided along with BMC device telemetry information and may include any information about the power spike event including, for example, an amount of power consumed during the power spike event, one or more PDUs associated with that power spike event, and/or any other power spike event information that would be apparent to one of skill in the art in possession of the present disclosure.

Figure 7B:
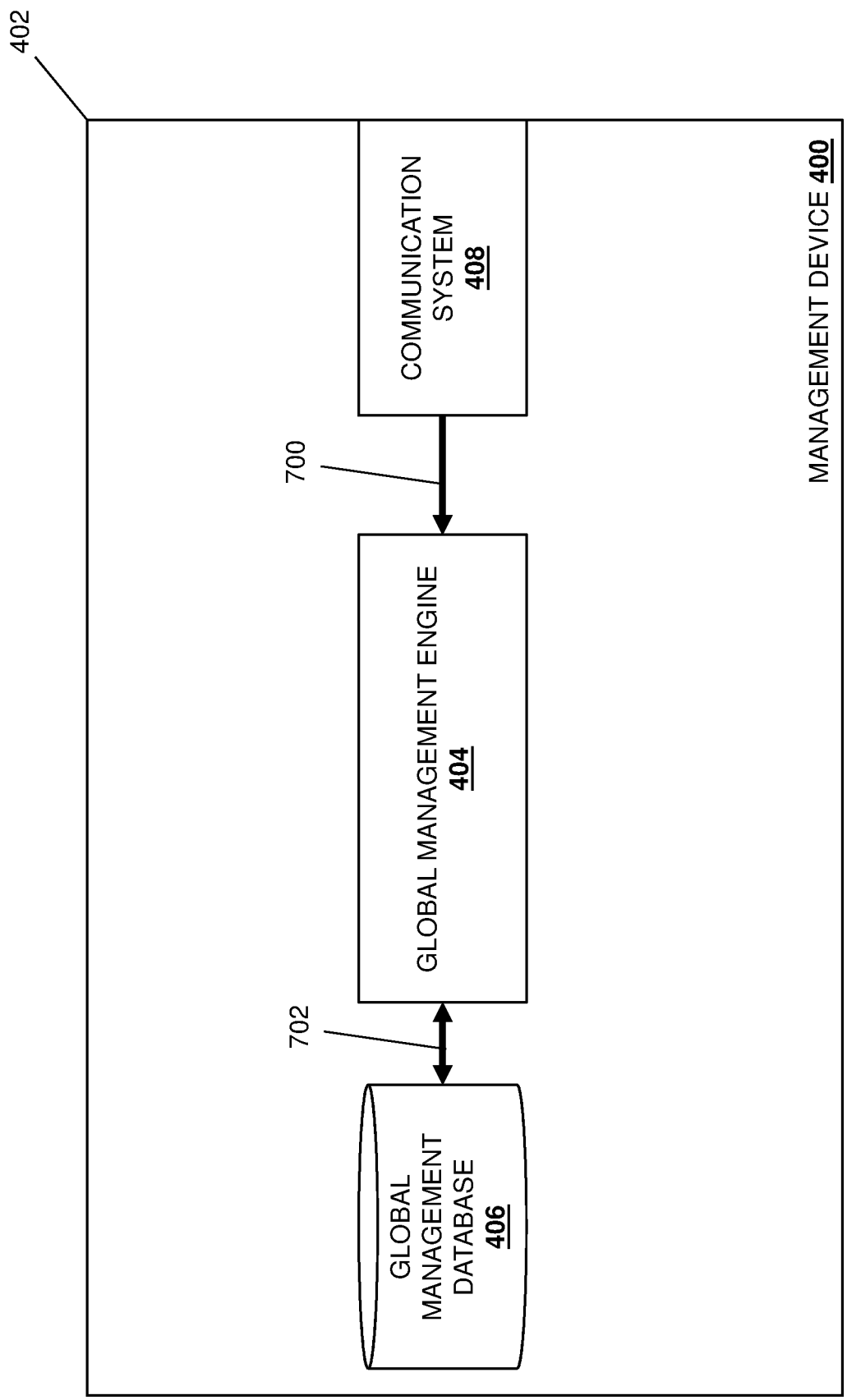
FIG. 7B is a schematic view illustrating an embodiment of the operation of the management device of FIG. 4 during the method of FIG. 5.

With reference to FIG. 7B, in an embodiment of block 508 and as part of the power spike event reporting operations 700 performed at decision block 506, the global management engine 404 in the management device 202/400 may receive the report of the power spike event and, in response, may perform power spike source identification operations 702 that include determining a source of the power spike event detected at decision block 506. In an embodiment, the power spike source identification operations 702 may include the global management engine 404 accessing the power consumption information and/or the hardware operation information stored in the global management database 406, and using that power consumption information and/or the hardware operation information to identify server device (s) and, in some examples, hardware components in the server device(s), that were the source of that power spike event.

As will be appreciated by one of skill in the art in possession of the present disclosure, the power consumption information and hardware operation information for each server device may identify the power consumption and hardware operation for that server device prior to, during, and/or subsequent to the power spike event, which may be analyzed by the global management engine 404 in the management device 202/400 to identify one or more server devices (and or one or more hardware components in those server devices) that are the likely cause of that power spike event. For example, the server device power consumption ranking discussed above may identify the server device 210*b* as the relatively highest power consuming server device in the networked system 200, while the hardware operation information may identify faults the cooling system in the server device 210*b*, and the power consumption information may identify the cooling system in the server device 210*b* as consuming a relatively high amount of power, and thus at block 508 the global management engine 404 in the management device 202/400 may identify the cooling system in the server device 210*b* as the source of the power spike event.

In some examples and in response to identifying the source of the power spike event at block 508, the global management engine 404 in the management device 202/400 may generate and transmit a power spike event source notification to a network administrator or other user (e.g., a text, email, or other notification known in the art) in order to identify the cooling system in the server device 210*b* as the source of the power spike event. However, while a simplified example of the identification of a single source of a power spike event has been described, one of skill in the art in possession of the present disclosure will appreciate that the teachings provided herein may allow for one or more sources of a power spike event to be determined in a variety of manners that will fall within the scope of the present disclosure as well.

Figure 8:
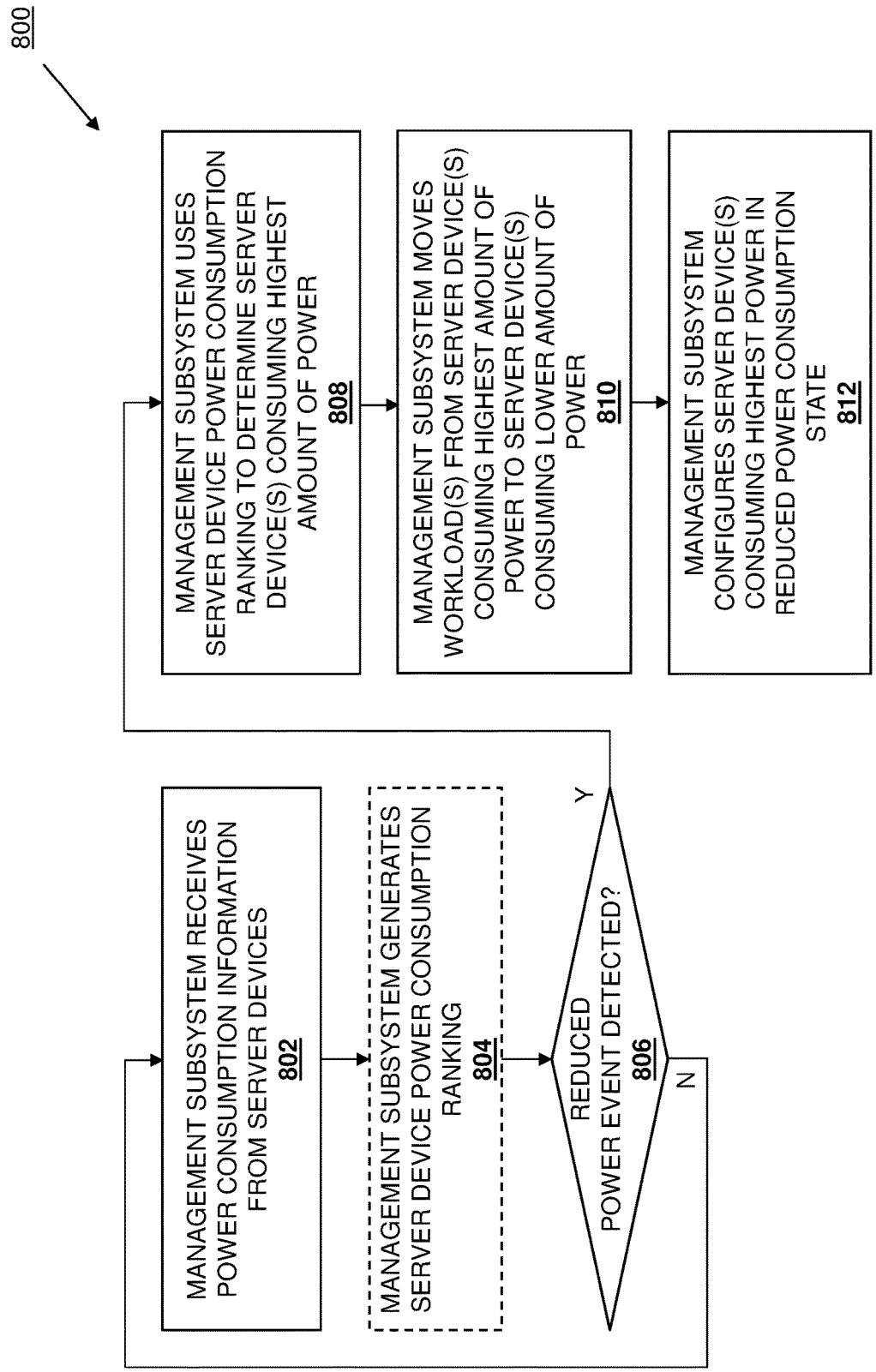
FIG. 8 is a flow chart illustrating an embodiment of a method for power/workload management.

Referring now to FIG. 8, an embodiment of a method 800 for power/workload management is illustrated. As discussed below, the systems and methods of the present disclosure provide for the collection of power consumption information from server devices for the generation of a server device power consumption ranking that is indicative of power consumption history of the server devices, and in the event of a reduced power event associated with the power system, the power consumption ranking may be utilized to identify a relatively high power consumption server device, move the workload from that relatively high power consumption server device to a relatively low power consumption server device, and configure the relatively high power consumption server device in a reduced power consumption state. For example, the power/workload management system of the present disclosure may include a power system that is coupled to a first computing device that is configured to perform a first workload, as well as to a second computing device. A management subsystem is coupled to the first computing device and the second computing device, and operates to identify a reduced power event associated with the power system and, in response, determine that the first computing device is associated with a higher power consumption than the second computing device. In response to determining that the first computing device is associated with the higher power consumption than the second computing device, the management subsystem moves the first workload to the second computing device such that the second computing device performs the first workload, and configures the first computing device in a reduced power consumption state. As such, the utilization of power during a reduced power event may be more efficient due to the ability to identify server devices that may not be using power efficiently, migrating the workloads from those server devices to more power-efficient server devices, and reducing the power consumption of those less power-efficient server devices.

The method 800 begins at block 802 where a management subsystem receives power consumption information from server devices. With reference back to FIGS. 6A, 6B, and 6C, in an embodiment of block 802, the local management engine 304*a* in each server device 300 (e.g., which may be provided by a management controller device in that server device) may perform power consumption information transmission operations 600 that include determining power consumption information that identifies the amount of power being consumed by that server device, and transmitting that power consumption information to the server device that is operating as the server cluster coordinator (e.g., the server device 210*a* in this example), as well as to the management device 202. In an embodiment, the power consumption information may be determined for each server device using a variety of power consumption determination techniques known in the art (e.g., via BMC device telemetry information), and may include a total amount of power being consumed by that server device, amounts of power being consumed by the different hardware components 310 in that server device, and/or any other power consumption information that would be apparent to one of skill in the art in possession of the present disclosure.

As such, with reference to FIG. 6D and as part of the power consumption information/hardware operation information transmission operations 600, the local management engine 304*a* in the server device 210*a*/300 (which is operating as the server cluster coordinator in this example) may receive the power consumption information from the other server devices, and perform power consumption information storage operations 602 to store the power consumption information in its local management database 306*a*. Similarly, with reference to FIG. 6E and as part of the power consumption information transmission operations 600, the global management engine 404 in the management device 202/400 may receive the power consumption information from the server devices, and perform power consumption information storage operations 604 to store the power consumption information in its global management database 406. As such, each of the server device 210*a*/300 (which is operating as the server cluster coordinator in this example) and the management device 202 may maintain a history of power consumption (via the power consumption information) for each of the server devices 210*a*-210*d*, 220*a*, and 220*b*, and that power consumption history for each server device 210*a*-210*d*, 220*a*, and 220*b* may be updated periodically (e.g., on subsequent iterations of the method 800)

The method 800 then proceeds to optional block 804 where the management subsystem may generate a server device power consumption ranking. In an embodiment, at block 804, the local management engine 304*a* in the server device 210*a*/300 (which is operating as the server cluster coordinator in this example) and/or the global management engine 404 in the management device 202/400 (either or both of which may provide the management subsystem in the power/workload management system of the present disclosure) may operate to use the power consumption information received at block 802 to generate a server device power consumption ranking. In an embodiment, the server device power consumption ranking may provide a ranking of the server devices 210*a*-210*d*, 220*a*, and 220*b* by their power consumption, power consumption pattern, and/or any other power consumption information that would be apparent to one of skill in the art in possession of the present disclosure. As such, the server device power consumption ranking may be derived from BMC device telemetry information and may identify which of the server devices 210*a*-210*d*, 220*a*, and 220*b* are consuming relatively more power, and which of the server devices 210*a*-210*d*, 220*a*, and 220*b* are consuming relatively less power. [

With reference to FIG. 6F, in some embodiments of block 804, the local management engine 304*a* in the server device 210*a* (which is operating as the server cluster coordinator in this example) and the global management engine 404 in the management device 202/400 may perform synchronization operations 606 in order to synchronize the server device power consumption ranking generated at block 804. As such, one of skill in the art in possession of the present disclosure will appreciate how block 804 may be optional in that the server device power consumption ranking need only be performed by one of the server cluster coordinator (e.g., the server device 210*a* in this example) and the management device 202 (and subsequently synchronized with the other, due to the fact that subsequent iterations of the method 800 may not require a re-generation of the of the server device power consumption ranking (e.g., because power consumption data has not changed), and for a variety of other reasons as well.

The method 800 then proceeds to decision block 806 where it is determined whether a reduced power event has been detected. In an embodiment, at decision block 806, the PDUs 206*a*, 208*a*, 216*a*, and 218*a*, and the UPS devices 212*a*, 212*b*, 222*a*, and 222*b* may operate to transmit and/or synchronize their corresponding power information and power events with the management device 202 (e.g., via any of the server devices), and one of skill in the art in possession of the present disclosure will appreciate how a wide variety of PDU information, PDU events, UPS information, and UPS events may be generated and transmitted/synchronized with the management device 202 while remaining within the scope of the present disclosure. Furthermore, the global management engine 404 in the management device 202/400 may then synchronize that power information and those power events with the server cluster coordinator (e.g., the server device 210*a* in this example). As such, at decision block 806, the global management engine 404 in the management device 202/400 may monitor the power information and power events reported (e.g., via any of the server devices) by the PDUs 206*a*, 208*a*, 216*a*, and 218*a*, and the UPS devices 212*a*, 212*b*, 222*a*, and 222*b* in order to determine whether a reduced power event has occurred.

In a specific example, the reduced power event may include the loss of power from the power sources 206*b*/208*b* and/or 216*b*/218*b* such that the backup power from the UPS devices 212*a*/212*b* and/or 222*a*/222 is required to continue operations of the server devices 210*a*-210*d* and/or 220*a*/220*b*. However, one of skill in the art in possession of the present disclosure will recognize that any reduced power event that requires some subset of server devices to be configured in a reduced power state will fall within the scope of the present disclosure as well. For example, some networked systems may experience power/voltage fluctuations (e.g., in power provided by the power sources 206*b*, 208*b*, 216*b*, and/or 218*b*) that can result in reduced power events while still providing power to devices in the networked system, and those reduced power events will benefit from the teachings of the present disclosure as well.

If, at decision block 806, it is determined that a reduced power event has not detected, the method 800 returns to block 802. As such, the method 800 may loop such that the server devices determine and transmit power consumption information to the server cluster coordinator and/or the management device, the server cluster coordinator and/or the management device optionally update (and/or synchronize) the server device power consumption ranking (if necessary), and the management device monitors for reduced power events as long as a reduced power event does not occur.

Figure 9A:
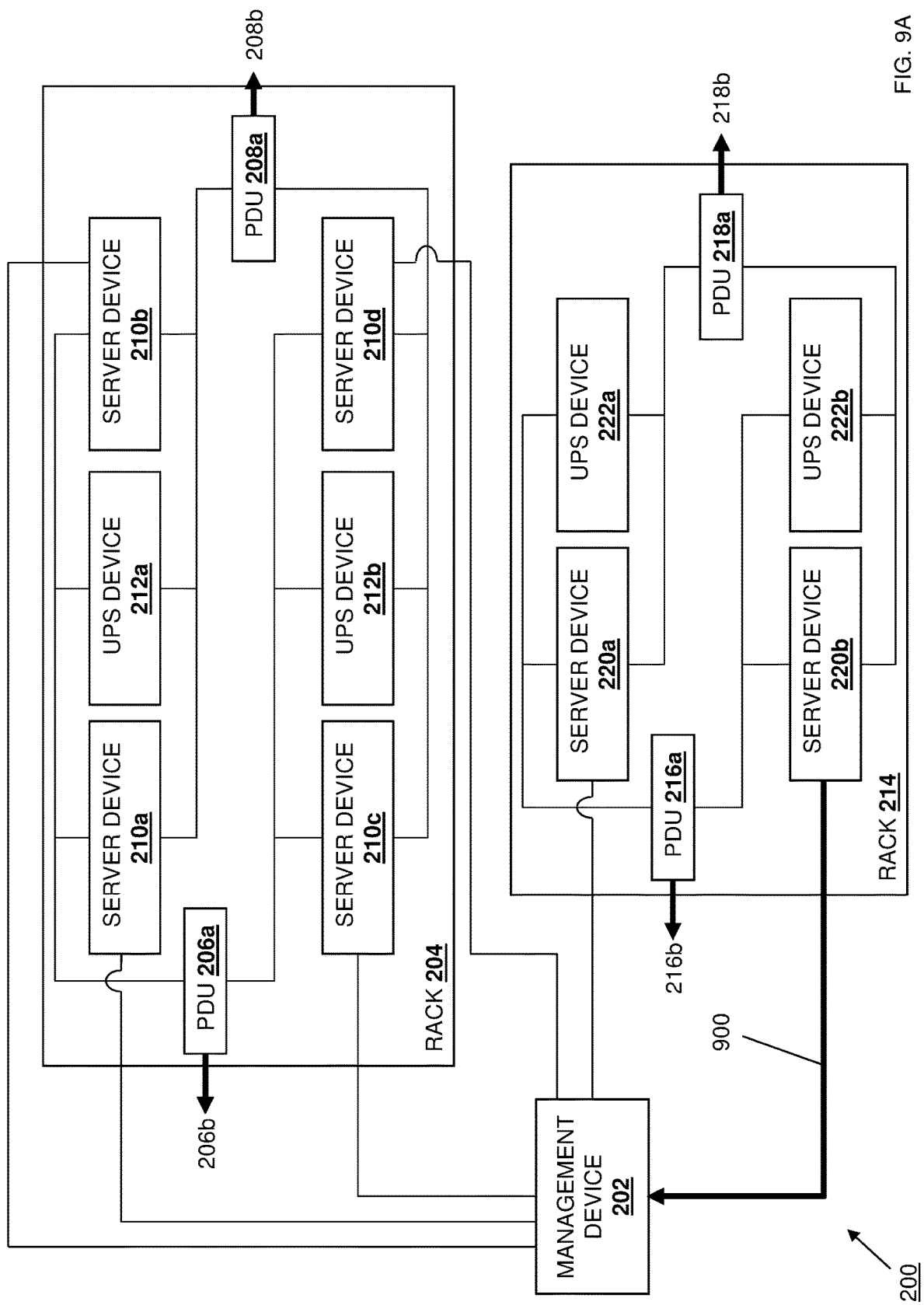
FIG. 9A is a schematic view illustrating an embodiment of the operation of the networked system of FIGS. 2A and 2B during the method of FIG. 8.
Figure 9B:
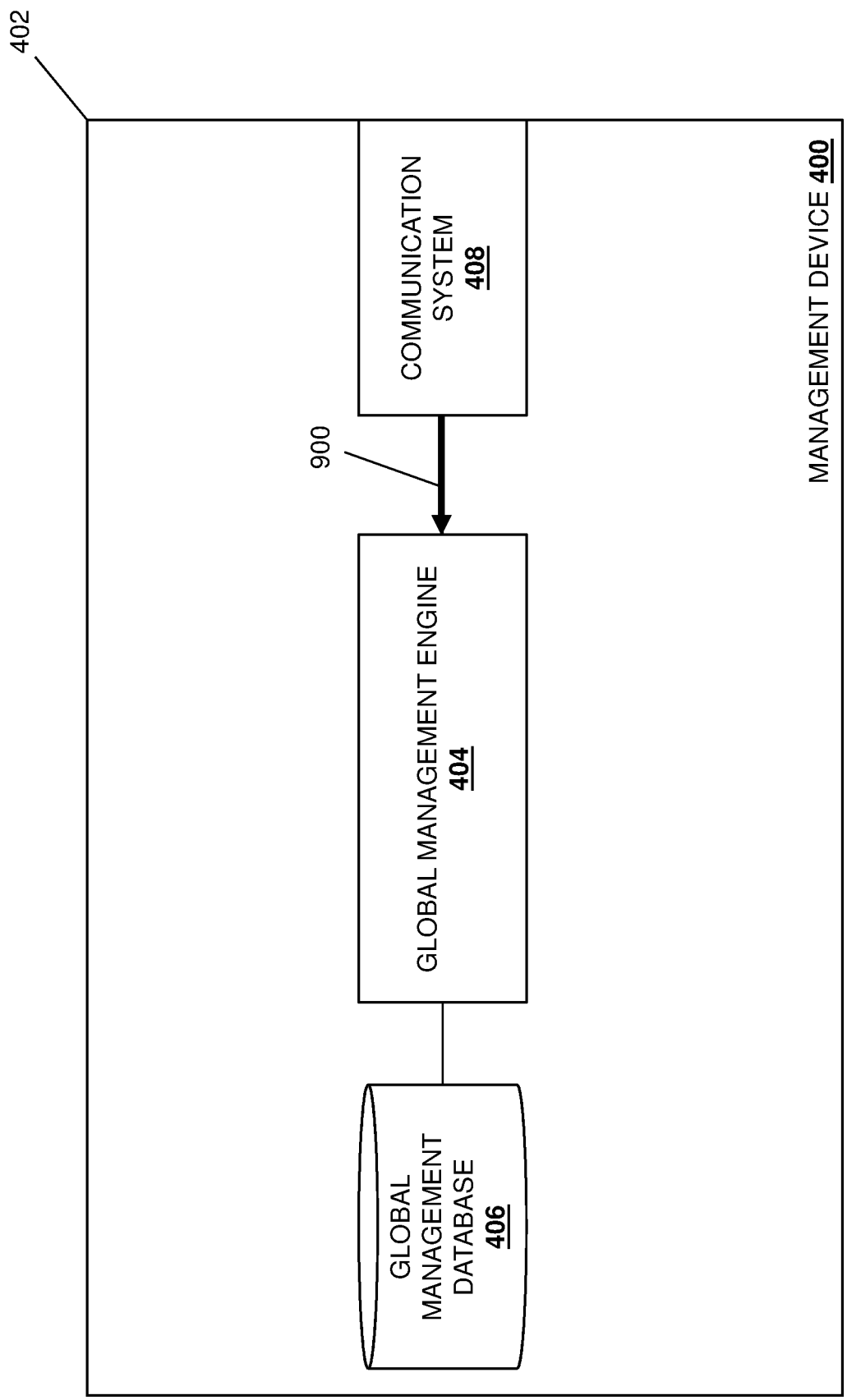
FIG. 9B is a schematic view illustrating an embodiment of the operation of the management device of FIG. 4 during the method of FIG. 8.

If at decision block 806, it is determined that a reduced power event has been detected, the method 800 proceeds to block 808 where the management subsystem uses the server device power ranking to identify server device(s) consuming the highest amount of power. With reference to FIGS. 9A and 9B, in an embodiment of decision block 806, the server device 220*b* may perform reduced power event reporting operations 900 in order to report a reduced power event to the management device 202, and the global management engine 404 in the management device 202/400 may receive the report of that reduced power event via its communication system 408. For example, as discussed above, power may become unavailable from the power sources 216*b* and 218*b* and, in response, the PDU 216*a* and/or 218*a*, and/or the UPS devices 222*a* and/or 222*b* may report that power unavailability to the server device 220*b*, which may then perform the power event reporting operations 900 in order to report the power unavailability to the management device 202. However, while a particular server device 220*b* is illustrated and described as reporting the reduced power event to the management device 202, one of skill in the art in possession of the present disclosure will appreciate that PDUs or UPS devices may, in some embodiments, report reduced power events to the management device 202 directly or via other server device while remaining within the scope of the present disclosure as well.

Figure 9C:
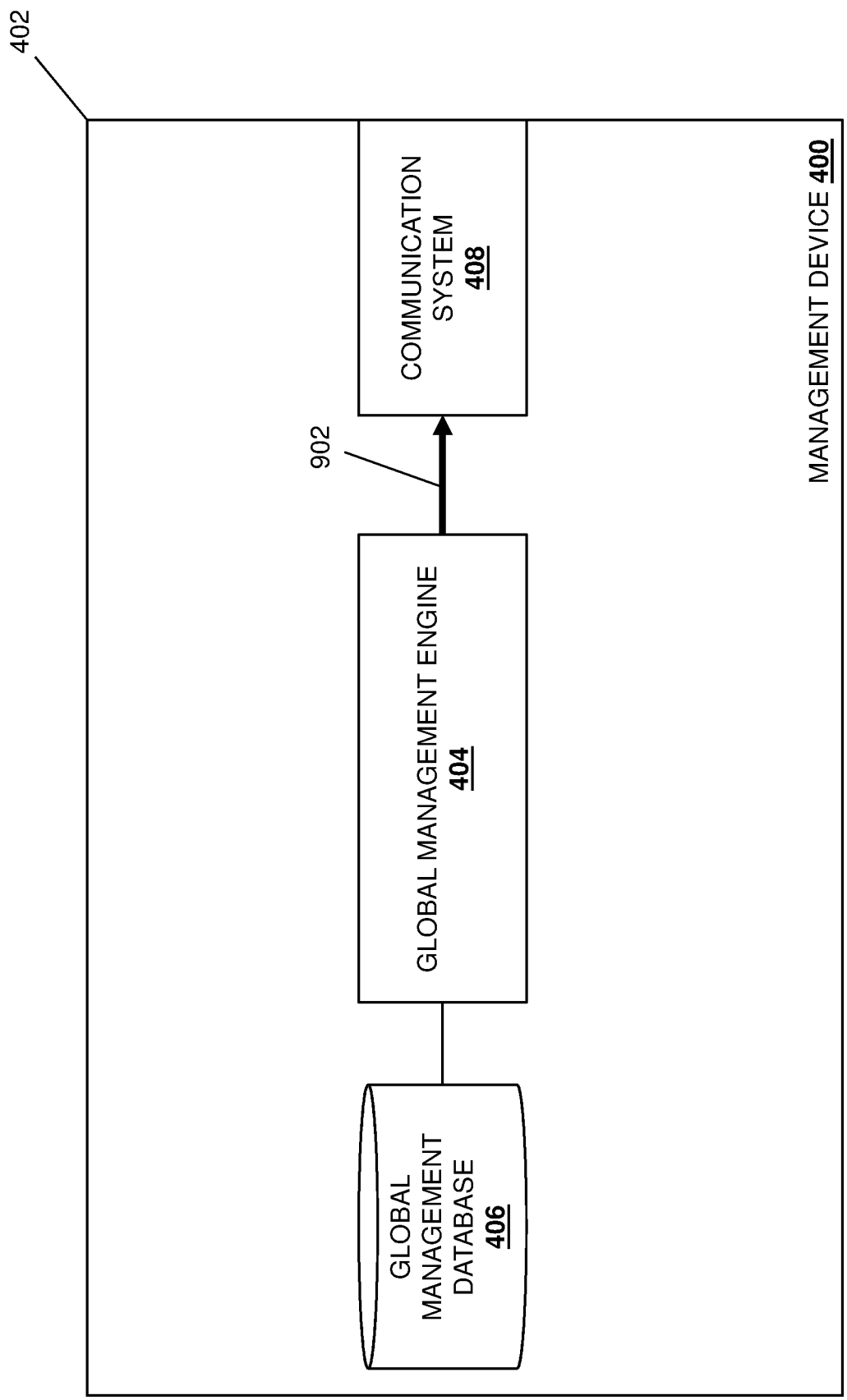
FIG. 9C is a schematic view illustrating an embodiment of the operation of the management device of FIG. 4 during the method of FIG. 8.
Figure 9D:
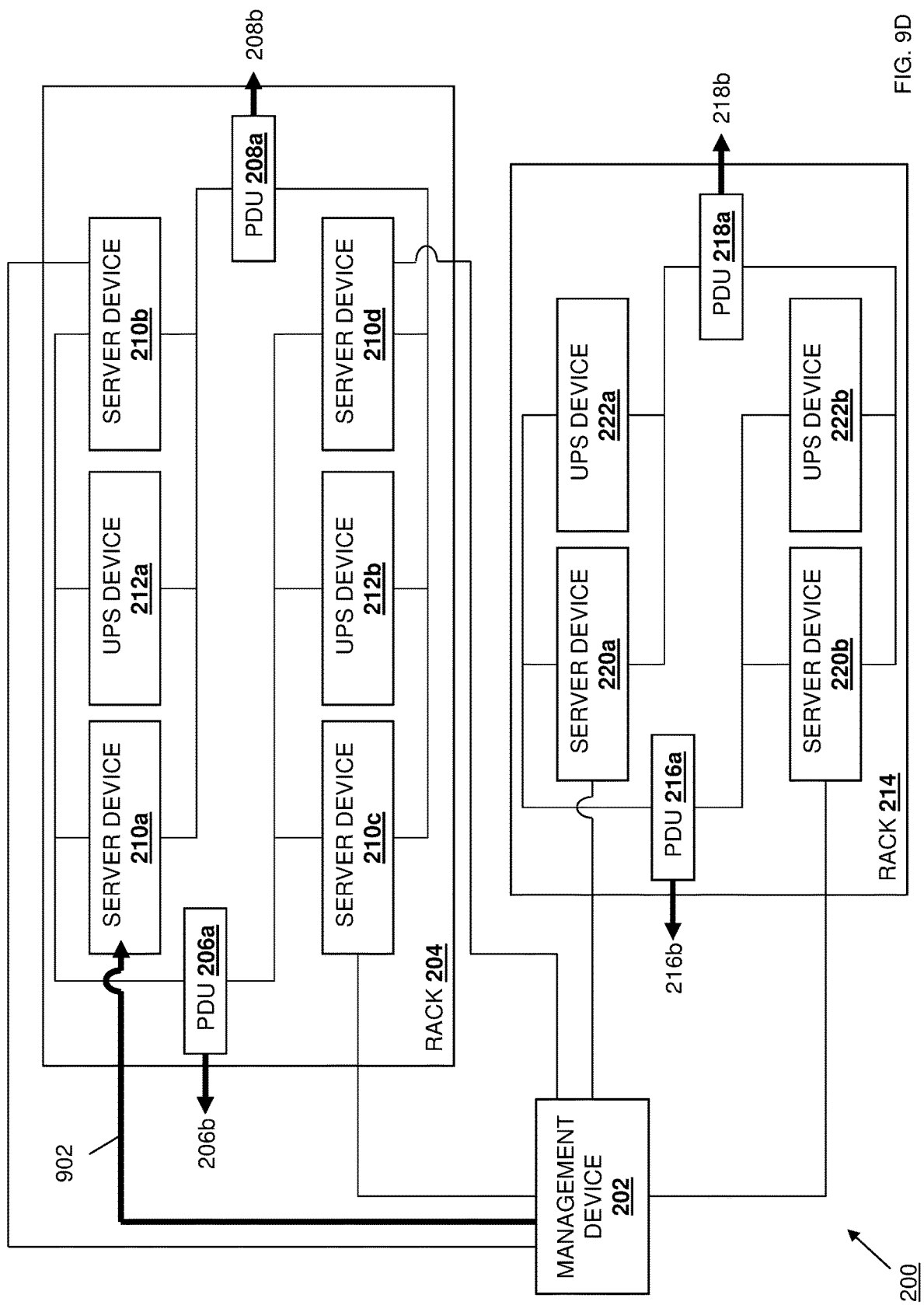
FIG. 9D is a schematic view illustrating an embodiment of the operation of the networked system of FIGS. 2A and 2B during the method of FIG. 8.

With reference to FIGS. 9C and 9D, in an embodiment of block 808, the global management engine 404 in the management device 202/400 may then perform reduced power event reporting operations 902 that include sending a report of the reduced power event via its communication system 408 to the server device 210*a* (which is operating as the server cluster coordinator in this example). As illustrated in FIG. 9E, the local management engine 304*a* in the server device 210*a* (which is operating as the server cluster coordinator in this example) may receive the report of the reduced power event as part of the reduced power event reporting operations 902 performed by the management device 202, and then perform server device identification operations 904 in order to access the server device power consumption ranking in its local management database 904 to identify server device(s) consuming the highest amount of power. As discussed below, the server device identification operations 904 may also include the identification of server device(s) consuming relatively low amounts of power in order to, for example, make workload migration decisions.

As discussed above, the server device power consumption ranking may identify the amount of power being consumed by the server devices 210*a*-210*d*, 220*a*, and 220*b*, and one of skill in the art in possession of the present disclosure will appreciate how server device(s) consuming the highest amount of power may be server device(s) with hardware component faults such as, for example, the storage device faults, memory device faults, cooling system faults, processing system faults, and/or other hardware faults that cause those server device(s) to consume relatively higher amounts of power than the others of the server devices. In the examples below, the server device 220*a* is identified as consuming the highest amount of power of the server devices 210*a*-210*d*, 220*a*, and 220*b*, while the server device 220*b* is identified as consuming a relatively low amount of power, but one of skill in the art in possession of the present disclosure will appreciate that more than one relatively high-power consuming server device and more than one relatively low-power consuming server device may be identified at block 808 while remaining within the scope of the present disclosure as well.

Figure 10A:
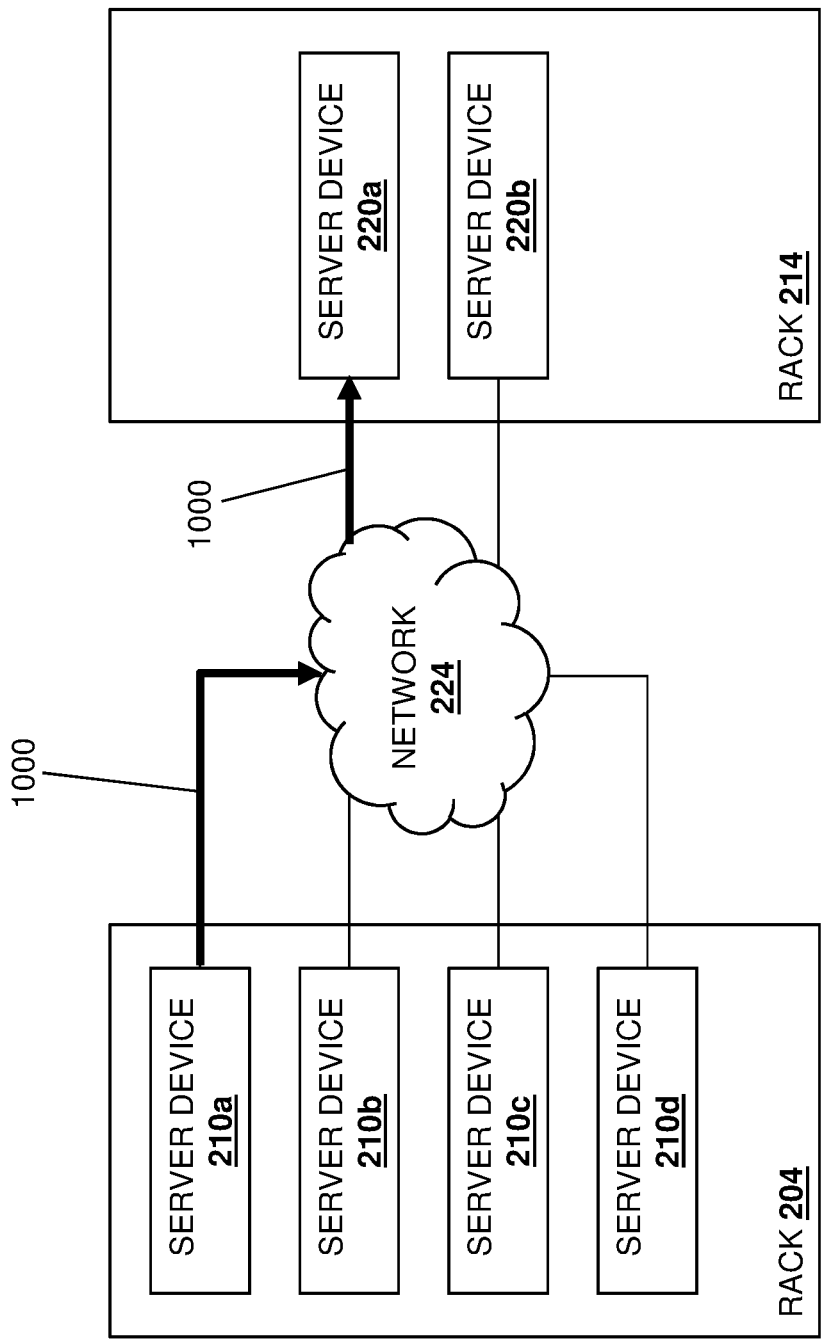
FIG. 10A is a schematic view illustrating an embodiment of the operation of the networked system of FIGS. 2A and 2B during the method of FIG. 8.
Figure 10B:
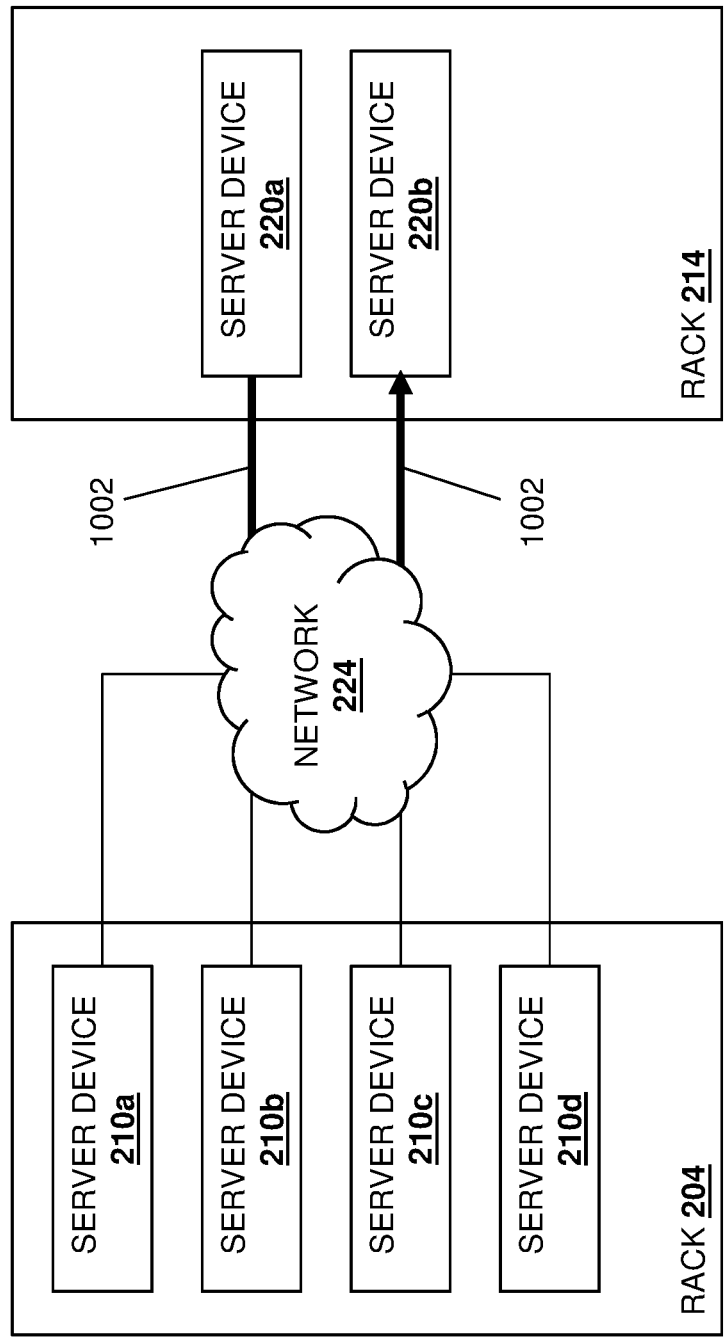
FIG. 10B is a schematic view illustrating an embodiment of the operation of the networked system of FIGS. 2A and 2B during the method of FIG. 8.

The method 800 then proceeds to block 810 where the management subsystem moves workload(s) from the server device(s) consuming the highest amount of power to server device(s) consuming lower amounts of power. With reference to FIG. 10A, in an embodiment of block 810, the local management engine 304*a* in the server device 210*a*/300 may perform workload movement instruction operations 1000 that include generating and transmitting (e.g., via its communication system 308) a workload movement instruction via the network 224 to the server device 220*a* that identifies the server device 220*b* and instructs the server device 220*a* to migrate its workloads to the server device 220*b*. With reference to FIG. 10B, in an embodiment of block 810 and in response to receiving the workload movement instruction as part of the workload movement instruction operations 1000, the hypervisor engines 304*b* and/or local management engines 304*a* in the server devices 220*a* and 220*b* may perform workload migration operations 1002 that include migrating (e.g., via their communication systems 308) workload(s) (e.g., virtual machines, etc.) that were previously performed by the server device 220*a* via the network 224 to the server device 220*b* so that those workload(s) may be performed by the server device 220*b*.

Figure 10C:
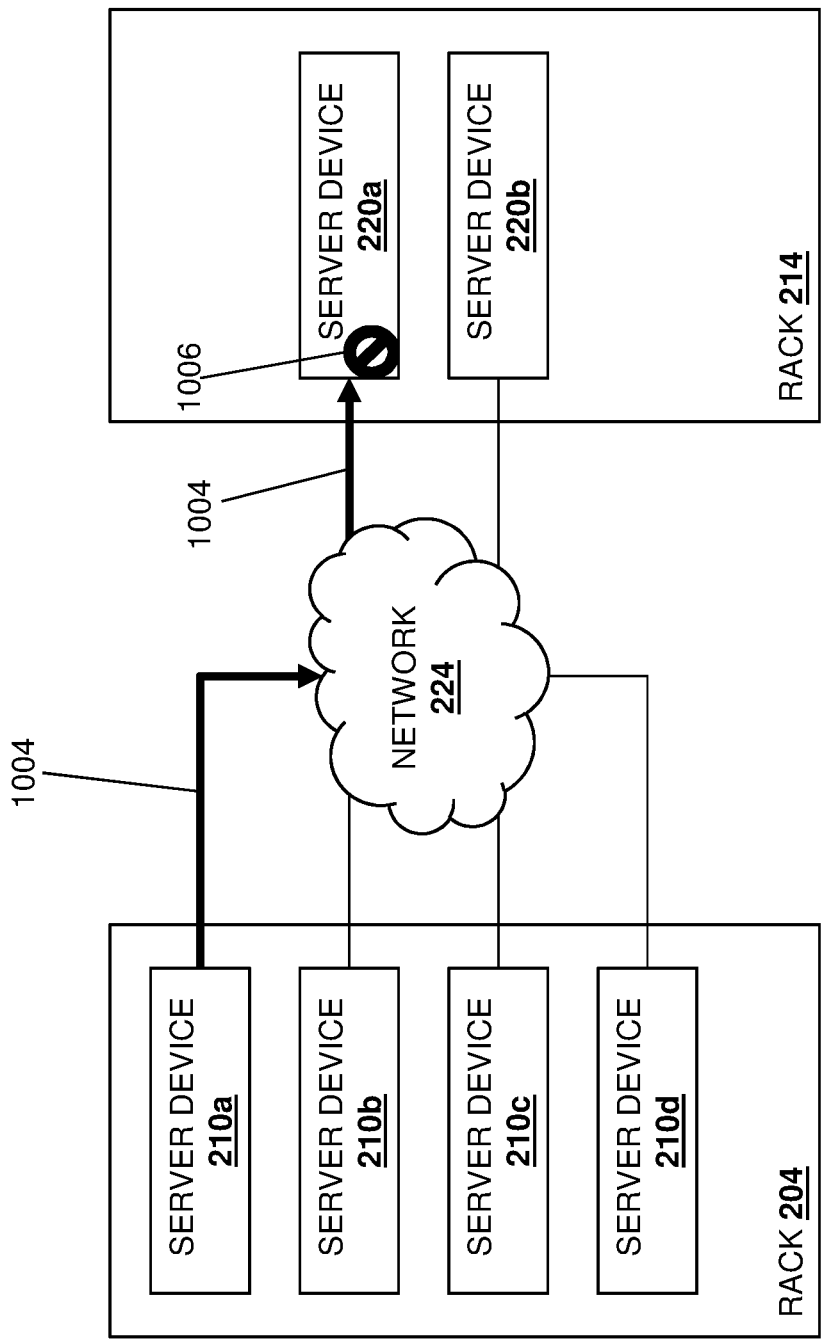
FIG. 10C is a schematic view illustrating an embodiment of the operation of the networked system of FIGS. 2A and 2B during the method of FIG. 8.

The method 800 then proceeds to block 812 where the management subsystem configures the server device(s) consuming the highest amount of power in a reduced power consumption state. With reference to FIG. 10C, in an embodiment of block 812, the local management engine 304*a* in the server device 210*a*/300 may perform reduced power consumption configuration operations 1004 in order to configure the server device 220 via the network 1004 in a reduced power consumption state such as, for example, a hibernation state, a sleep state, and/or any other reduced power consumption state that one of skill in the art in possession of the present disclosure will recognize as causing the server device 220*a* to consume less power than it had been consuming prior to the reduced power consumption configuration operations 1004. As such, the use of power available from the UPS devices 222*a* and 222*b* may be optimized by migrating workloads from power inefficient server devices (e.g., the server device 220*a* in the example above) to power-efficient server devices (e.g., the server device 220*b* in the example above), and shutting down the power inefficient server devices (e.g., the server device 220*a* in the example above) so that it does not consume the limited battery backup power from the UPS devices 222*a* and 222*b*.

Thus, systems and methods have been described that provide for the collection of power consumption information from server devices for the generation of a server device power consumption ranking that is indicative of the power consumption history, and in the event of a reduced power event associated with the power system, the power consumption ranking may be utilized to identify a relatively high power consumption server device, move the workload from that relatively high power consumption server device to a relatively low power consumption server device, and configure the relatively high power consumption server device in a reduced power consumption state. As such, the utilization of power during a reduced power event may be more efficient due to the ability to identify server devices that may not be using power efficiently, migrating the workloads from those server devices to more power-efficient server devices, and reducing the power consumption of those less power-efficient server devices.

Although illustrative embodiments have been shown and described, a wide range of modification, change and substitution is contemplated in the foregoing disclosure and in some instances, some features of the embodiments may be employed without a corresponding use of other features. Accordingly, it is appropriate that the appended claims be construed broadly and in a manner consistent with the scope of the embodiments disclosed herein.

What is claimed is:

1. A power/workload management system, comprising:
   a power system;
   a first computing device that is coupled to the power system and that is configured to perform a first workload;
   a second computing device coupled to the power system; and
   a management subsystem that is coupled to the first computing device and the second computing device, wherein the management subsystem is configured to:
      receive power consumption information from each of the first computing device and the second computing device;
      generate, using the power consumption information received from each of the first computing device and the second computing device, a computing device power consumption ranking;
      identify, subsequent to generating the computing device power consumption ranking, a reduced power event that includes a reduction in power available from the power system to the first computing device and the second computing device;
      determine, in response to identifying the reduced power event and using the computing device power consumption ranking, that the first computing device is associated with a higher power consumption than the second computing device;
      move, in response to identifying the reduced power event and determining that the first computing device is associated with the higher power consumption than the second computing device, the first workload to the second computing device such that the second computing device performs the first workload; and
      configure, in response to moving the first workload to the second computing device, the first computing device in a reduced power consumption state in which the first computing device include reduced operating capabilities.

2. The system of claim 1, wherein the power system includes battery backup device, and wherein the reduced power event includes a primary power supply loss that causes the first computing device and the second computing device to consume power from the battery backup device.

3. The system of claim 1, wherein the power consumption information includes Baseboard Management Controller (BMC) device telemetry information received from a respective BMC device included in each of the first computing device and the second computing device.

4. The system of claim 1, wherein the reduced power consumption state is a hibernate state.

5. The system of claim 1, wherein the management subsystem is configured to:
   receive computing device hardware operation information from each of the first computing device and the second computing device; and
   store, in a database, the computing device hardware operation information received from each of the first computing device and the second computing device.

6. The system of claim 5, wherein the management subsystem is configured to:
   identify a power spike event associated with the power system; and
   use the computing device hardware operation information for each of the first computing device and the second computing device stored in the database to identify which of the first computing device and second computing device is responsible for the power spike event.

7. An Information Handling System (IHS), comprising:
   a processing system; and
   a memory system that is coupled to the processing system and that includes instructions that, when executed by the processing system, cause the processing system to provide a management engine that is configured to:
      receive power consumption information from each of a first computing device and a second computing device;
      generate, using the power consumption information received from each of the first computing device and the second computing device, a computing device power consumption ranking;
      identify, subsequent to generating the computing device power consumption ranking, a reduced power event that includes a reduction in power available from a power system to the first computing device and the second computing device that are coupled to the power system;
      determine, in response to identifying the reduced power event and using the computing device power consumption ranking, that the first computing device is associated with a higher power consumption than the second computing device;
      move, in response to identifying the reduced power event and determining that the first computing device is associated with the higher power consumption than the second computing device, the first workload to the second computing device such that the second computing device performs the first workload; and
      configure, in response to moving the first workload to the second computing device, the first computing device in a reduced power consumption state in which the first computing device include reduced operating capabilities.

8. The IHS of claim 7, wherein the power system includes battery backup device, and wherein the reduced power event includes a primary power supply loss that causes the first computing device and the second computing device to consume power from the battery backup device.

9. The IHS of claim 7, wherein the power consumption information includes Baseboard Management Controller (BMC) device telemetry information received from a respective BMC device included in each of the first computing device and the second computing device.

10. The IHS of claim 7, wherein the reduced power consumption state is a hibernate state.

11. The IHS of claim 7, wherein the management engine is configured to:
receive computing device hardware operation information from each of the first computing device and the second computing device; and
store, in a database, the computing device hardware operation information received from each of the first computing device and the second computing device.

12. The IHS of claim 11, wherein the management engine is configured to:
identify a power spike event associated with the power system; and
use the computing device hardware operation information for each of the first computing device and the second computing device stored in the database to identify which of the first computing device and second computing device is responsible for the power spike event.

13. The IHS of claim 7, wherein the management engine is configured to:
perform computing device cluster coordination operations for the first computing device and the second computing device.

14. A method for power/workload management, comprising:
receiving, by a management subsystem, power consumption information from each of a first computing device and a second computing device;
generating, by the management subsystem using the power consumption information received from each of the first computing device and the second computing device, a computing device power consumption ranking;
identifying, by the management subsystem subsequent to generating the computing device power consumption ranking, a reduced power event that includes a reduction in power available from a power system to the first computing device and the second computing device that are coupled to the power system;
determining, by the management subsystem in response to identifying the reduced power event and using the computing device power consumption ranking, that the first computing device is associated with a higher power consumption than the second computing device;
moving, by the management subsystem in response to identifying the reduced power event and determining that the first computing device is associated with the higher power consumption than the second computing device, the first workload to the second computing device such that the second computing device performs the first workload; and
configuring, by the management subsystem in response to moving the first workload to the second computing device, the first computing device in a reduced power consumption state in which the first computing device include reduced operating capabilities.

15. The method of claim 14, wherein the power system includes battery backup device, and wherein the reduced power event includes a primary power supply loss that causes the first computing device and the second computing device to consume power from the battery backup device.

16. The method of claim 14, power consumption information includes Baseboard Management Controller (BMC) device telemetry information received from a respective BMC device included in each of the first computing device and the second computing device.

17. The method of claim 14, wherein the reduced power consumption state is a hibernate state.

18. The method of claim 14, further comprising:
receiving, by the management subsystem, computing device hardware operation information from each of the first computing device and the second computing device; and
storing, by the management subsystem in a database, the computing device hardware operation information received from each of the first computing device and the second computing device.

19. The method of claim 18, further comprising:
identifying, by the management subsystem, a power spike event associated with the power system; and
using, by the management subsystem, the computing device hardware operation information for each of the first computing device and the second computing device stored in the database to identify which of the first computing device and second computing device is responsible for the power spike event.

20. The method of claim 14, further comprising:
performing, by the management subsystem, computing device cluster coordination operations for the first computing device and the second computing device.

* * * * *